United States Patent
Trundle

(10) Patent No.: US 9,948,902 B1
(45) Date of Patent: Apr. 17, 2018

(54) VIDEO CAMERA AND SENSOR INTEGRATION

(71) Applicant: Alarm.com Incorporated, Vienna, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 391 days.

(21) Appl. No.: 14/642,341

(22) Filed: Mar. 9, 2015

Related U.S. Application Data

(60) Provisional application No. 61/949,665, filed on Mar. 7, 2014.

(51) Int. Cl.
| | |
|---|---|
| *G06F 19/00* | (2011.01) |
| *H04N 7/18* | (2006.01) |
| *G08B 13/00* | (2006.01) |
| *G06K 9/00* | (2006.01) |

(52) U.S. Cl.
CPC ......... *H04N 7/183* (2013.01); *G06K 9/00771* (2013.01)

(58) Field of Classification Search
CPC ........ G06F 19/00; H04N 7/181; H04N 7/183; H04N 7/18; H04N 7/188; G08B 13/19656
See application file for complete search history.

(56) References Cited

U.S. PATENT DOCUMENTS

| | | | | |
|---|---|---|---|---|
| 2006/0209176 | A1* | 9/2006 | Nakamura | G08B 25/10 348/14.01 |
| 2007/0035627 | A1* | 2/2007 | Cleary | G08B 13/19608 348/159 |
| 2015/0116501 | A1* | 4/2015 | McCoy | H04N 5/23206 348/169 |

* cited by examiner

*Primary Examiner* — Behrooz Senfi
*Assistant Examiner* — Maryam Nasri
(74) *Attorney, Agent, or Firm* — Fish & Richardson P.C.

(57) ABSTRACT

Video camera and sensor integration, in which an event is detected at a property based on sensor data and, based on the detected event, multiple cameras are controlled to operate in a tracking mode. One or more moving objects are detected in images captured by the cameras and metadata related to capture of the one or more moving objects is determined. Tracking operations of the cameras is coordinated based on the metadata.

19 Claims, 16 Drawing Sheets

VIDEO CAMERA AND SENSOR INTEGRATION

CROSS REFERENCE TO RELATED APPLICATIONS

The present application claims the benefit of U.S. Provisional Application No. 61/949,665, filed Mar. 7, 2014, which is incorporated herein by reference in its entirety for all purposes.

TECHNICAL FIELD

This disclosure relates to video camera and sensor integration technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for video camera and sensor integration.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integration of video cameras with a security intrusion system. Multiple pan/tilt cameras perform robotic tracking of objects during a detected intrusion and assess the quality of images being captured as well as data about the object being tracked. The multiple cameras coordinate tracking of objects based on the quality of images and the data about the object being tracked.

Figure 1:
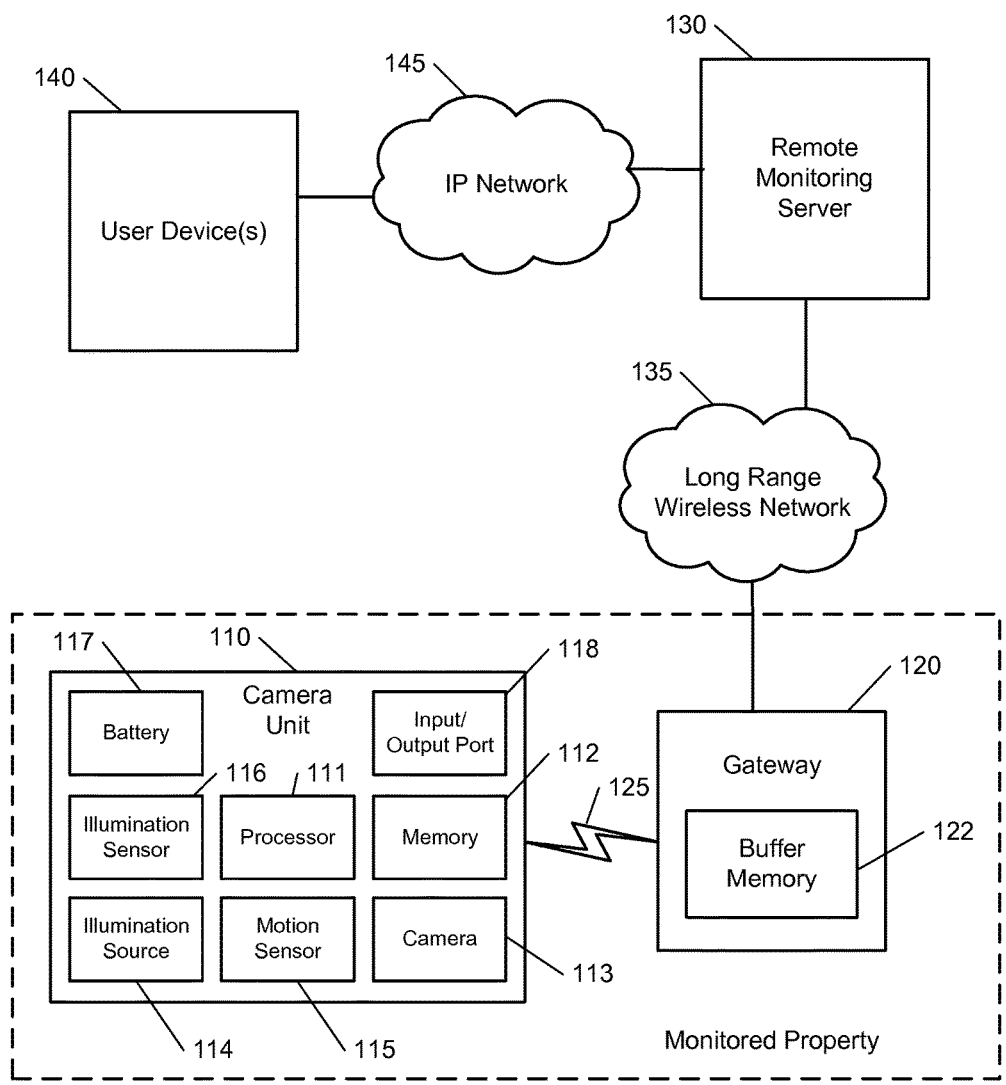
FIGS. 1 and 2 illustrate example systems.

FIG. 1 illustrates an example of an electronic system 100 configured to provide video camera and sensor integration. The system 100 includes a camera unit 110, a gateway 120, a remote monitoring server 130, and one or more user devices 140. The camera unit 110 is a relatively small and affordable unit that captures still images of an area that corresponds to a location of the camera unit. Because the camera unit 110 is relatively small, runs off of battery power, and communicates via a wireless communication protocol, the camera unit 110 may be easily placed at any location within a monitored property (or just outside of a monitored property) to provide image surveillance of an area of the monitored property (or an area just outside of the monitored property). The camera unit 110 may have pan and tilt capabilities that enable the camera unit 110 to track a moving object and capture video over a wide range.

The camera unit 110 includes a processor 111, a memory 112, a camera 113, an illumination source 114, a motion sensor 115, an illumination sensor 116, a battery 117, and an input/output port 118. The processor 111 controls operations of the camera unit 110 and may be any suitable processor. The memory 112 stores instructions that are executed by the processor 111 and also stores images captured by the camera 113. The memory 112 may be any type of memory that is capable storing data and may include a combination of multiple, memory units. For example, the memory 112 may be a Flash memory component that stores both instructions that are executed by the processor and images captured by the camera 113.

The camera 113 captures images of an area proximate to where the camera unit is located. For instance, the camera 113 may be placed at an upper corner of a room in a building and, in this instance, the camera 113 captures images of the room. The camera 113 may be a video/photographic camera or other type of optical sensing device configured to capture images. In some implementations, the camera 113 is a CMOS camera sensor (or other CCD sensor) that captures images at various, different resolutions. For instance, the CMOS camera sensor may capture up to 640×480 pixels (e.g., VGA resolution). The camera 113 also may capture a lower resolution image (e.g., Quarter VGA=QVGA=320× 240 pixels).

The illumination source 114 may be any source of illumination that improves capturing of images in a dark area. For example, the illumination source 114 may include one or more Infra Red LEDs that emit Infra Red light over an area within a field of view of the camera 113 to illuminate objects within the area. The processor 111 may control the illumination source 114 to emit light when the illumination sensor 116 detects a level of light that is below a threshold level.

The motion sensor 115 may be Passive Infra Red (PIR) motion sensor, a microwave motion sensor, or any type of sensor that detects motion in an area corresponding to a field of view of the camera 113. The processor 111 may monitor output of the motion sensor 115 and trigger the camera 113 to capture images in response to the motion sensor 115 detecting motion in the area corresponding to the field of view of the camera 113.

The battery 117 is the power source of the camera unit 110 and may be any type of battery capable of delivering power to the camera unit 110. The battery 117 may have a relatively small size and may be a standard type of battery available for purchase at retail stores. The battery 117 may be located in a compartment that is easily accessible to a user of the camera unit 110 to facilitate changing of the battery 117, which may occur relatively frequently (e.g., every couple of months) depending on the power consumption and image capture settings of the camera unit 110.

The input/output port 118 is a communication interface through which the camera unit may send and receive wireless communications. The input/output port 118 may, using a short range wireless protocol (e.g., Bluetooth, Z-Wave, ZigBee, local wireless 900 MHz communication band, etc.), receive and send short range wireless communications with other devices, such as the gateway 120. The input/output port 118 may include a "normally open" or "normally closed" digital input that can trigger capture of images using the camera 113.

In some implementations, the camera unit 110 may include a thermocouple input and/or a built-in thermocouple at the camera unit 110. The built-in thermocouple may be located in a top rear of the camera unit 110 away from other heat emitting parts of the camera unit 110. In these implementations, the camera unit 110 may report anytime measured temperatures exceed thresholds, and also may report temperature data that can be used to compliment thermostat temperature data. For example, from thermocouple measurements, the system 100 may determine that temperature in a room with a thermostat is hotter or colder than temperature in another room by a meaningful amount. In this example, the system 100 may determine that a heating or cooling system is operating with relatively low efficiency based on a determination that temperature in a room is hotter or colder than temperature in another room by a meaningful amount. The system 100 may send an alert to a user when inefficient operation of the heating or cooling system is detected.

To reduce processing power needed and to conserve battery life, the processor 111 may control components of the camera unit 110 to periodically enter sleep mode operation. For example, the processor 111 may awaken every second to determine whether any communications have been received at the input/output port 118. If no communications have been received, the processor 111 may place itself and other components (e.g., the memory 112, the camera 113, etc.) in a sleep mode for another second before awaking again to determine whether any communications have been received at the input/output port 118. The processor 111 also may awaken from a sleep mode state based on output from the motion sensor 115 indicating that motion has been detected.

In some implementations, the processor 111 of the camera unit 110 conserves battery power and costs of data transmission by analyzing reduced resolution versions of images captured by the camera 113 for relevant or interesting activity before sending the images to the gateway 120. In these implementations, the processor 111 may wait for an event detected by the motion sensor 115 and, in response to the event, control the camera 113 to capture a full resolution image (e.g., VGA resolution at 640×480 pixels). The processor 111 then extracts reduced resolution luminance data from the full resolution image (e.g., 80×60 pixels for 4800 data points) and searches the reduced resolution luminance data for motion that is limited roughly to a quarter of the total image area. If the processor 111 finds motion that is limited roughly to a quarter of the total image area, the processor 111 extracts the QVGA region from the original, full resolution VGA image and sends only that portion to the gateway 120. If the processor 111 does not find motion that is limited roughly to a quarter of the total image area, the processor 111 analyzes any motion within the total image area to determine whether the motion is indicative or relevant/interesting activity. If the processor 111 determines that the motion is indicative or relevant/interesting activity, the processor 111 sends the QVGA version of the full image to the gateway 120. If the processor 111 determines that no motion exists or the motion is not indicative or relevant/interesting activity, the processor 111 discards the image without transmitting it to the gateway 120.

In some examples, the camera unit 110 offers plug and play installation, where the gateway 120 dynamically discovers the camera unit 110 and begins interacting with the camera unit 110. The camera unit 110 also may be controlled locally through a local control input device (e.g., an on/off button or a capture image button) or a gesture. For instance, a user may perform a gesture in front of the camera unit 110 to control the camera unit 110 to enter an off state in which images are not captured.

In some implementations, the camera unit 110 may include tamper alert mechanisms. In these implementations, the camera unit 110 may analyze images captured by the camera unit 110 to determine whether the camera has been covered. For instance, the camera unit 110 may detect covering when several captured images are completely dark (or entirely a single color) when the illumination sensor 116 indicates that the area within the field of view of the camera 113 is illuminated or the illumination source 114 was used when the images were captured. Further, the camera unit 110 may include an accelerometer that detects movement of the camera unit 110 or may detect movement of the camera unit 110 based on images captured by the camera unit 110. The camera unit 110 may send an alert to the gateway 120 when the camera unit 110 detects covering or movement and the gateway 120 may relay the alert to the remote monitoring server 130 so that action to address the potential tampering can be taken.

The gateway 120 is a communication device configured to exchange short range wireless communications with the camera unit 110 over the communication link 125 and long range wireless communications with the remote monitoring server 130 over the network 135. Because the gateway 120 exchanges short range wireless communications with the camera unit 110, the gateway 120 is positioned nearby the camera unit 110. As shown in FIG. 1, the gateway 120 and the camera unit 110 are both located within a monitored property that is remote (and may be very far away from) the remote monitoring server 130.

In some examples, the gateway 120 may include a wireless communication device configured to exchange long range communications over a wireless data channel. In this example, the gateway 120 may transmit header data and image data over a wireless data channel. The gateway 120 may include one or more of a GSM module, a radio modem, cellular transmission module, or any type of module configured to exchange communications in one of the following formats: GSM or GPRS, CDMA, EDGE or EGPRS, EV-DO or EVDO, or UMTS.

The gateway 120 includes a buffer memory 122 that stores image data captured by the camera unit 110. The buffer memory 122 may temporarily store image data captured by the camera unit 110 to delay a decision of whether the image data (or a subset of the image data) is worthwhile to send to the remote monitoring server 130. The buffer memory 122 may be larger than the memory 112 of the camera unit 110 and, because the gateway 120 operates using an AC power source, using the buffer memory 122 to store images captured by the camera unit 110 may be more efficient. The gateway 120 also may include a display with which the stored images may be displayed to a user.

The long range wireless network 135 enables wireless communication between the gateway 120 and the remote monitoring server 130. The long range wireless network 135 may be any type of cellular network and may support any one or more of the following protocols: GSM or GPRS, CDMA, EDGE or EGPRS, EV-DO or EVDO, or UMTS. It may be relatively expensive to transmit data over the long range wireless network 135 and, therefore, the camera unit 110 and the gateway 120 may be selective in the image data transmitted to the remote monitoring server 130.

The remote monitoring server 130 receives image data from the gateway 120 over the long range wireless network 135. The remote monitoring server 130 stores the received image data and makes the image data available to one or more user devices 140 over the IP-based network 145. For instance, the remote monitoring server 130 may make the image data available to the one or more user devices 140 at a website accessible by the one or more user devices 140 over the Internet. The remote monitoring server 130 also may make the image data available to the one or more user devices 140 in an electronic message, such as an electronic mail message.

In some implementations, the remote monitoring server 130 receives the image data from the gateway 120 as a reference image and a series of differential images that indicate the difference between the corresponding image and the reference image. In these implementations, header information sent with the image data indicates which images are reference images, which images are differential images, and which reference image each differential image corresponds to. The remote monitoring server 130 processes the reference image and the differential images and converts each image into a standard image format, such as JPEG. The remote monitoring server 130 then stores the converted images in a database or a file system and makes the converted images available to the one or more user devices 140.

Figure 2:
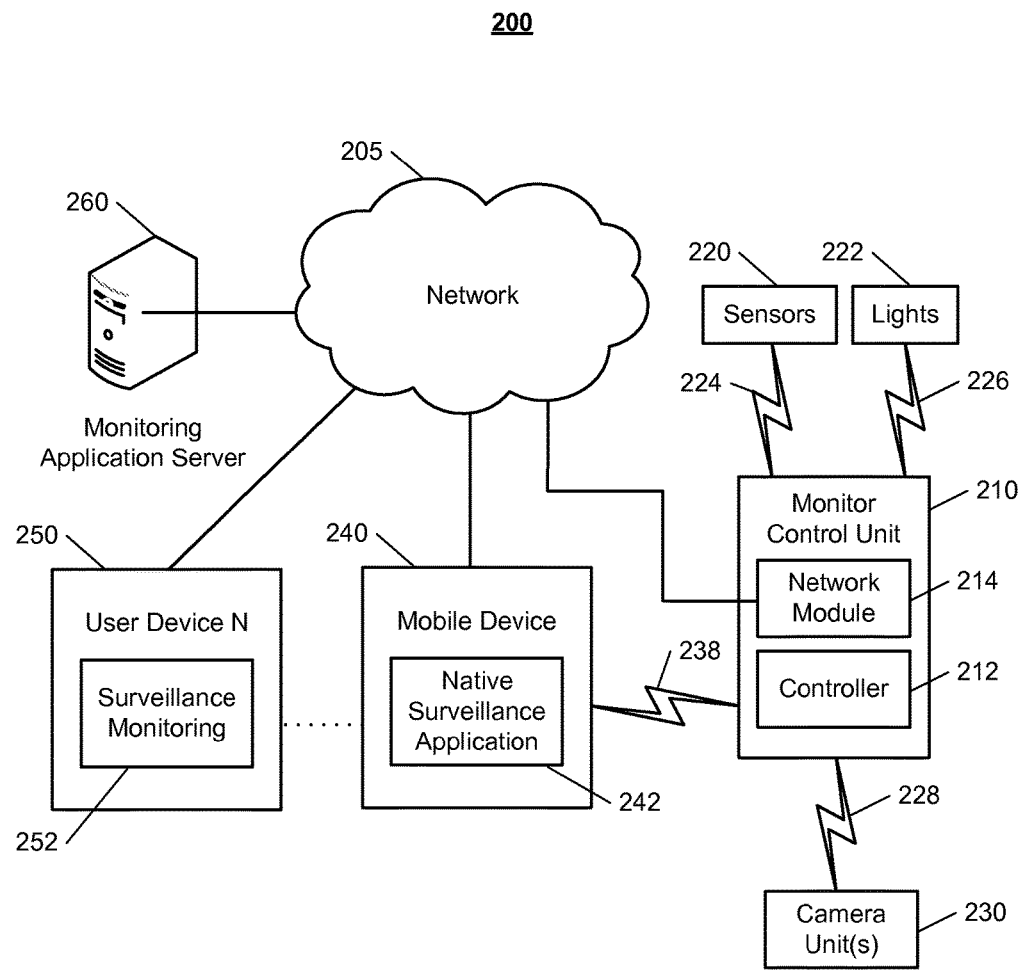

FIG. 2 illustrates an example of an electronic system 200 configured to provide surveillance and reporting. The electronic system 200 includes a network 205, a monitoring system control unit 210, one or more user devices 240, 250, and a monitoring application server 260. In some examples, the network 205 facilitates communications between the monitoring system control unit 210, the one or more user devices 240, 250, and the monitoring application server 260.

The network 205 is configured to enable exchange of electronic communications between devices connected to the network 205. For example, the network 205 may be configured to enable exchange of electronic communications between the monitoring system control unit 210, the one or more user devices 240, 250, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system control unit 210 communicates with the module 222 and the multiple camera units 230 to perform visual surveillance or monitoring. The module 222 is connected to one or more lighting systems and is configured to control operation of the one or more lighting systems. The module 222 may control the one or more lighting systems based on commands received from the monitoring system control unit 210. For instance, the module 222 may cause a lighting system to illuminate an area to provide a better image of the area when captured by multiple camera units 230.

The multiple camera units 230 may include a video/photographic camera or other type of optical sensing device configured to capture images. For instance, the multiple camera units 230 may be configured to capture images of an area within a building monitored by the monitoring system control unit 210. The multiple camera units 230 may be configured to capture single, static images of the area and also video images of the area in which multiple images of the area are captured at a relatively high frequency (e.g., thirty images per second). The multiple camera units 230 may have pan and tilt features that enable the multiple camera units 230 to change their field of view and capture images of a greater portion of the property. The multiple camera units 230 may coordinate pan and tilt movements to capture the most interesting activity in the property and avoid redundant imaging of overlapping areas and/or the same object. The multiple camera units 230 may be controlled based on commands received from the monitoring system control unit 210. Each of the multiple camera units 230 may be similar to the camera unit 110 described above with respect to FIG. 1.

The sensors 220, the module 222, and the multiple camera units 230 communicate with the controller 212 over communication links 224, 226, and 228. The communication links 224, 226, and 228 may be a wired or wireless data pathway configured to transmit signals from the sensors 220, the module 222, and the multiple camera units 230 to the controller 212. The sensors 220, the module 222, and the multiple camera units 230 may continuously transmit sensed values to the controller 212, periodically transmit sensed values to the controller 212, or transmit sensed values to the controller 212 in response to a change in a sensed value.

The communication link 228 over which the multiple camera units 230 and the controller 212 communicate may include a local network. The multiple camera units 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitoring system control unit 210 and the one or more user devices 240, 250 over the network 205. For example, the monitoring application server 260 may be configured to monitor events generated by the monitoring system control unit 210. In this example, the monitoring application server 260 may exchange electronic communications with the network module 214 included in the monitoring system control unit 210 to receive information regarding alarm events detected by the monitoring system control unit 210. The monitoring application server 260 also may receive information regarding events from the one or more user devices 240, 250.

The monitoring application server 260 may store sensor and image data received from the monitoring system and perform analysis of sensor and image data received from the monitoring system. Based on the analysis, the monitoring application server 260 may communicate with and control aspects of the monitoring system control unit 210 or the one or more user devices 240, 250.

The one or more user devices 240, 250 are devices that host and display user interfaces. For instance, the user device 240 is a mobile device that hosts one or more native applications (e.g., the native surveillance application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 240 to receive and process image and sensor data from the monitoring system.

The user device 250 may be a general-purpose computer (e.g., a desktop personal computer, a workstation, or a laptop computer) that is configured to communicate with the monitoring application server 260 and/or the monitoring system control unit 210 over the network 205. The user device 250 may be configured to display a surveillance monitoring user interface 252 that is generated by the user device 250 or generated by the monitoring application server 260. For example, the user device 250 may be configured to display a user interface (e.g., a web page) provided by the monitoring application server 260 that enables a user to perceive images captured by the multiple camera units 230 and/or reports related to the monitoring system. Although FIG. 2 illustrates two user devices for brevity, actual implementations may include more (and, perhaps, many more) or fewer user devices.

In some implementations, the one or more user devices 240, 250 communicate with and receive monitoring system data from the monitoring system control unit 210 using the communication link 238. For instance, the one or more user devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more user devices 240, 250 to local security and automation equipment. The one or more user devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240, 250 are shown as communicating with the monitoring system control unit 210, the one or more user devices 240, 250 may communicate directly with the sensors and other devices controlled by the monitoring system control unit 210. In some implementations, the one or more user devices 240, 250 replace the monitoring system control unit 210 and perform the functions of the monitoring system control unit 210 for local monitoring and long range/offsite communication.

In other implementations, the one or more user devices 240, 250 receive monitoring system data captured by the monitoring system control unit 210 through the network 205. The one or more user devices 240, 250 may receive the data from the monitoring system control unit 210 through the network 205 or the monitoring application server 260 may relay data received from the monitoring system control unit 210 to the one or more user devices 240, 250 through the network 205. In this regard, the monitoring application server 260 may facilitate communication between the one or more user devices 240, 250 and the monitoring system.

In some implementations, the one or more user devices 240, 250 may be configured to switch whether the one or more user devices 240, 250 communicate with the monitoring system control unit 210 directly (e.g., through link 238) or through the monitoring application server 260 (e.g., through network 205) based on a location of the one or more user devices 240, 250. For instance, when the one or more user devices 240, 250 are located close to the monitoring system control unit 210 and in range to communicate directly with the monitoring system control unit 210, the one or more user devices 240, 250 use direct communication. When the one or more user devices 240, 250 are located far from the monitoring system control unit 210 and not in range to communicate directly with the monitoring system control unit 210, the one or more user devices 240, 250 use communication through the monitoring application server 260.

Although the one or more user devices 240, 250 are shown as being connected to the network 205, in some implementations, the one or more user devices 240, 250 are not connected to the network 205. In these implementations, the one or more user devices 240, 250 communicate directly with one or more of the monitoring system components and no network (e.g., Internet) connection or reliance on remote servers is needed.

In some implementations, the one or more user devices 240, 250 are used in conjunction with only local sensors and/or local devices in a house. In these implementations, the system 200 only includes the one or more user devices 240, 250 and the sensors 220, the module 222, and the multiple camera units 230. The one or more user devices 240, 250 receive data directly from the sensors 220, the module 222, and the multiple more camera units 230 and sends data directly to the sensors 220, the module 222, and the multiple camera units 230. The one or more user devices 240, 250 provide the appropriate interfaces/processing to provide visual surveillance and reporting.

In other implementations, the system 200 further includes network 205 and the sensors 220, the module 222, and the multiple camera units 230 are configured to communicate sensor and image data to the one or more user devices 240, 250 over network 205 (e.g., the Internet, cellular network, etc.). In yet another implementation, the sensors 220, the module 222, and the multiple camera units 230 (or a component, such as a bridge/router) are intelligent enough to change the communication pathway from a direct local pathway when the one or more user devices 240, 250 are in close physical proximity to the sensors 220, the module 222, and the multiple camera units 230 to a pathway over network 205 when the one or more user devices 240, 250 are farther from the sensors 220, the module 222, and the multiple camera units 230. In some examples, the system leverages GPS information from the one or more user devices 240, 250 to determine whether the one or more user devices 240, 250 are close enough to the sensors 220, the module 222, and the multiple camera units 230 to use the direct local pathway or whether the one or more user devices 240, 250 are far enough from the sensors 220, the module 222, and the multiple camera units 230 that the pathway over network 205 is required. In other examples, the system leverages status communications (e.g., pinging) between the one or more user devices 240, 250 and the sensors 220, the module 222, and the multiple camera units 230 to determine whether communication using the direct local pathway is possible. If communication using the direct local pathway is possible, the one or more user devices 240, 250 communicate with the sensors 220, the module 222, and the multiple camera units 230 using the direct local pathway. If communication using the direct local pathway is not possible, the one or more user devices 240, 250 communicate with the sensors 220, the module 222, and the multiple camera units 230 using the pathway over network 205.

In some implementations, the system 200 provides end users with access to images captured by the multiple camera units 230 to aid in decision making. The system 200 may transmit the images captured by the multiple camera units 230 over a wireless WAN network to the user devices 240, 250. Because transmission over a wireless WAN network may be relatively expensive, the system 200 uses several techniques to reduce costs while providing access to significant levels of useful visual information.

For instance, the system 200 may employ monitoring schedules to determine which periods of time when a recording device (e.g., the multiple camera units 230) will be active. The monitoring schedules may be set based on user input defining when users would like the recording device (e.g., the multiple camera units 230) to be active. The monitoring schedules also may be automatically set based on monitoring past activity related to the building being monitored by the monitoring system. For example, when the monitoring system is a home alarm system, the monitoring system may detect periods of time when users are typically at home and away from home and set monitoring schedules based on the detected periods of time. In this example, the monitoring system may set the recording device (e.g., the multiple camera units 230) to be active during time periods when users are detected as typically being away from home.

In some implementations, a state of the monitoring system and other events sensed by the monitoring system may be used to enable/disable video/image recording devices (e.g., the multiple camera units 230). In these implementations, the multiple camera units 230 may be set to capture images on a periodic basis when the alarm system is armed in an "Away" state, but set not to capture images when the alarm system is armed in a "Stay" state or disarmed. In addition, the multiple camera units 230 may be triggered to begin capturing images when the alarm system detects an event, such as an alarm event, a door opening event for a door that leads to an area within a field of view of the multiple camera units 230, or motion in the area within the field of view of the multiple camera units 230. In other implementations, the multiple camera units 230 may capture images continuously, but the captured images may be stored or transmitted over a network based on the monitoring schedules discussed above.

In some examples, full-resolution, uncompressed images captured by the multiple camera units 230 may be stored locally at the monitoring system. For instance, the full-resolution, uncompressed images may be saved in the multiple camera units 230 on non-volatile memory or by transmitting the full-resolution, uncompressed images to the controller 212 for storage in non-volatile memory associated with the monitoring system control unit 210. The stored images may be full quality JPEG images.

In examples in which full-resolution, uncompressed images are stored locally at the monitoring system, if an image is captured during a time period of interest, a reduced resolution and quality image may be sent from the local system to an end user device (e.g., the user device 240 or the user device 250) for initial display to the user. The user then may retrieve the higher quality image (or information sufficient to convert a reduced resolution image to a higher quality image) from the local system if desired.

The multiple camera units 230 may be security video cameras integrated in a security intrusion system. When an alarm is triggered, the multiple camera units 230 record a video clip that includes a limited amount of activity before the alarm (e.g., the "buffer activity"), which is typically ten to thirty seconds of pre-event video, as well as video that is generated after the alarm. These video clips may be sent to the monitoring application server 260 and/or the one or more user devices 240, 250 as described above.

Security video solutions, however, may suffer several problems. For example, savvy intruders may know to cut the communication lines going into the property before attempting an intrusion. In this example, by cutting the communication lines to the property, which are typically easily accessible outside the property, the intruders disable any wired communication from the property. In another example, the video recorded by the security cameras may only capture fragments of the intruders as they move in and out of the field of view of the cameras and the video may not provide a central station, assuming video verification is being used, with any metadata that can help the central station make a judgment on the nature of the alarm, and the danger that might be faced by first responders. As a consequence, first responders may be dispatched to alarms that are highly likely to be false or unprepared for alarms that are highly likely to be real.

In some implementations, the multiple camera units 230 may be configured to attempt to address these issues. For example, the multiple camera units 230 may have a motorized pan/tilt capability which provides a wide range of view. In this example, the multiple camera units 230 may include an edge-based video analytics capability, which enables the multiple camera units 230 to distinguish a moving object from a static object, the direction of movement of a moving object, the expected quality of the images that the camera is recording (e.g., whether such images or video are likely to be discernible) and whether one object in motion is the same object as a subsequent object in motion. With these features, the multiple camera units 230 may capture more relevant images over a larger portion of the monitored property and also provide information (e.g., metadata) regarding the quality of the content captured in the images. In terms of quality, the multiple camera units 230 may assess quality by analyzing pixel variation and/or determining whether the content in the image appears to be expected content (e.g., whether an object has the shape of a person's body and/or whether a face in the image is looking at the camera).

In some examples, when the intrusion system 200 detects a potential breach of the perimeter security layer, the multiple camera units 230 may be messaged from the monitoring application server 260 to stand ready in an automatic robotic tracking mode. In the automatic robotic tracking mode, the multiple camera units 230 capture images and monitor for motion in the captured images. The moment a camera unit included in the multiple camera units 230 detects motion, the camera unit begins to track and record video and/or still images of the first subject that comes into any part of the field of view of the camera unit. The camera unit establishes a rating for its image quality and creates metadata to describe the object (e.g., the first subject) that it is recording. The metadata may be sent (e.g., sent instantly) to the monitoring system control unit 210 and to the monitoring application server 260 via one or two connection paths (e.g., direct via internet from the camera unit, and via cellular by the network module 214 attached to the monitoring system control unit 210).

In some implementations, the image/video metadata also may be sent to the other camera units in the multiple camera units 230 that are part of the system 200. If any two camera units recognize that they have the same or very similar image metadata, then the camera unit that is furthest from the object described by the metadata may cease robotic tracking of that object and initiate a fast paced scan to pick up any other moving objects in the property. In this regard, the further camera unit may avoid redundantly imaging an object that is already well covered by the near camera unit and may gain video of another object (e.g., suspect) in the property that would otherwise be uncaptured if the further camera unit continued tracking the first object.

If the security system 200 is disarmed with a valid code (e.g., valid PIN), then the monitoring application server 260 or the monitoring system control unit 210, may message the camera units 230 to cease robotic object tracking and return to their normal user-driven settings. The message to the camera units 230 may be transmitted via either an internet connection, or via cellular and then to the camera units 230 via a wireless radio frequency (RF) signal.

As the multiple camera units 230 track and record video of one or more objects, the multiple camera units 230 may be intelligently splicing out high quality images from the video stream, compressing such images using compression similar to that described above, and then sending the compressed images via a local RF connection to the monitoring system control unit 210 where such images are instantly uploaded to the monitoring application server 260 via a cellular connection. In this manner, the multiple camera units 230 may still be effective at verifying alarms and gathering evidence for prosecution of the perpetrator even if the wire lines outside the property were cut before the intrusion was perpetrated.

In some implementations, the multiple camera units 230 also may include a small rechargeable battery which has its charge maintained either by harvesting power from the routine robotic tracking and movement of the camera unit (e.g., when it is powered appropriately), by a small solar tab mounted on the camera unit, and/or by RF energy harvesting measures. Such battery (e.g., a backup battery) may be capable of powering the tracking of the camera unit and the wireless RF transmission of the images for at least three minutes. If the camera unit loses its primary power source, the camera unit may automatically transition to a power save mode and no longer record full video, or attempt sophisticated video analytics. By eliminating these power uses, the battery power may be preserved. Instead, the camera unit may use all power for the collection of images, the transmission of images, and limited tracking and metadata creation of a moving object.

In some examples, the system 200 may be capable of creating varying amounts of metadata about the objects which have triggered an alarm (e.g., if the system is not disarmed). The multiple camera units 230 themselves may include basic video analytics engines which create first order metadata (e.g., size of object, movement of object, person or animal, etc.). Clips and/or images that are sent to the monitoring application server 260 may be further analyzed and a richer metadata set may be established. At the server level, the system 200 may determine things such as: the number of people in the property immediately after the alarm, the number of times one or all of those in the property have previously been in the property, the likelihood that one or all of those in the property are residents or employees in the property, etc. The user may define rules that are stored at the server level to further assist in metadata creation that is rendered at the server level. For example, the user/owner may provide a rule that states that any person that is at the property more than ten times in a twenty day period after the hour of 9:30 pm and before the hour of 8 am is a resident, while anyone who accesses the property more than ten times in a twenty day period, but never between 9:30 pm and 8 am is an employee. The user may further upload images of trusted parties, such as family members. The monitoring application server 260 may further establish rich metadata by using other information, such as a geographic location data of a recent entrant if geographic location services were activated by that user (e.g., using the one or more user device 240, 250), the passcode (e.g., the PIN) that the occupant keyed into the panel to attempt to disarm the panel, and the pattern of peripheral sensor events immediately prior and after the alarm event. The monitoring application server 260 may use this information to create a rich metadata set about the alarm. The monitoring application server 260 may operate an alarm-probability engine that uses such rich metadata to create and transmit to the central station information about the alarm including a score on a false alarm probability index.

Figure 3:
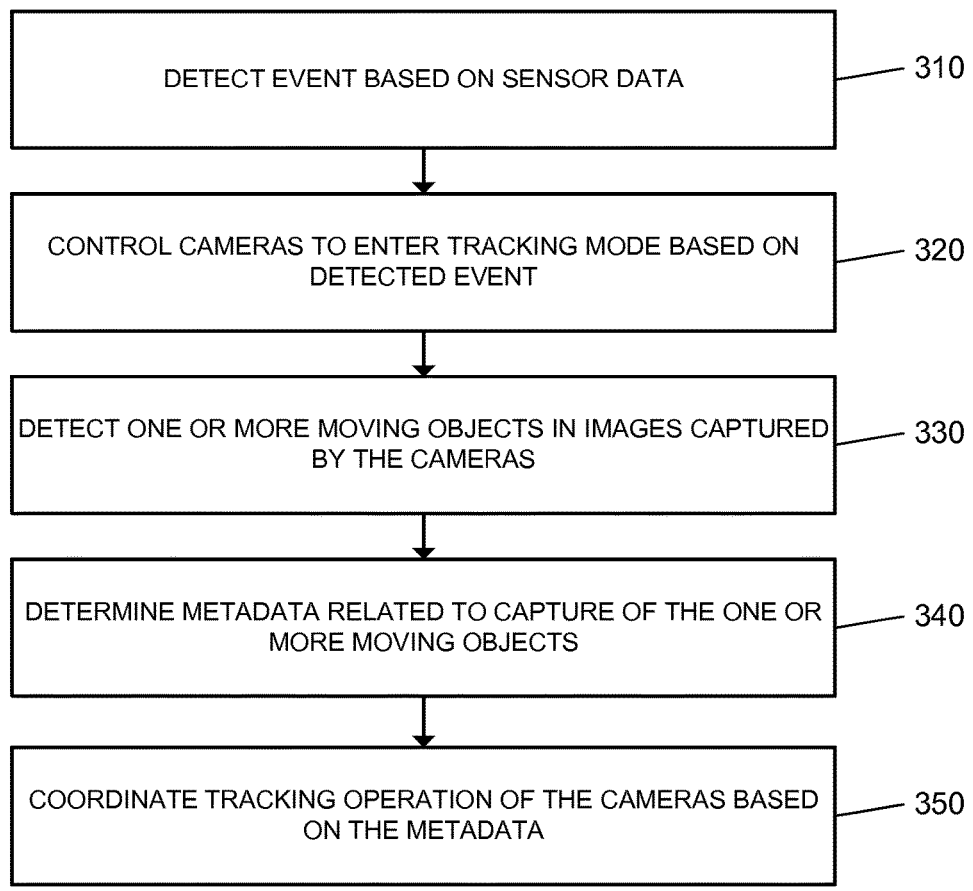
FIGS. 3, 5, and 7 are flowcharts of example processes.
Figure 5:
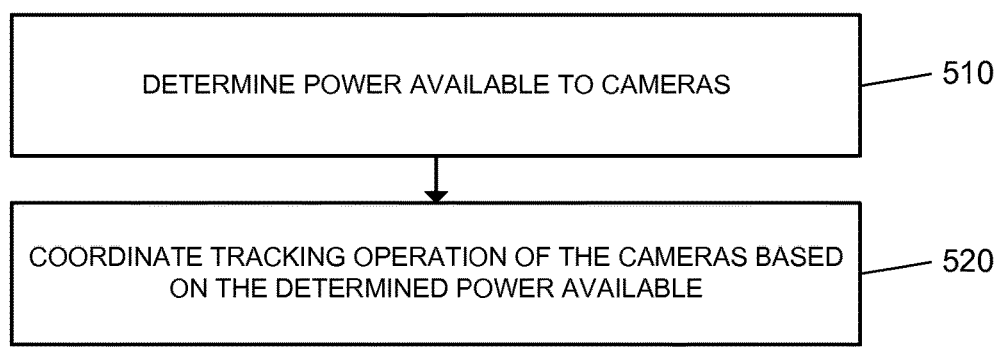
Figure 7:
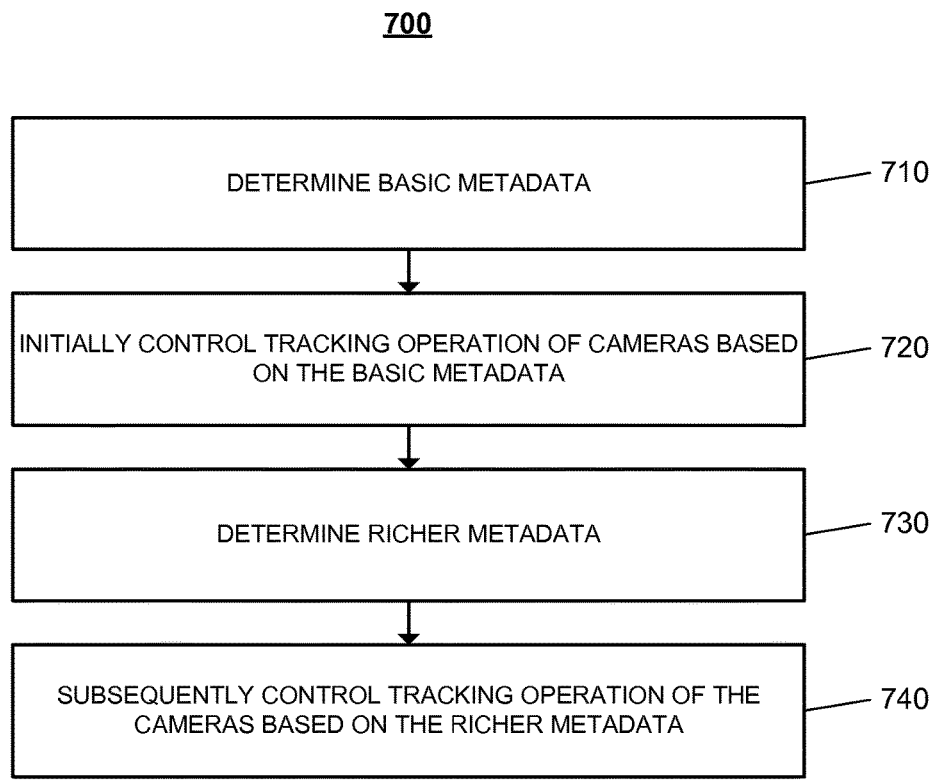

FIGS. 3, 5, and 7 illustrate example processes. The operations of the example processes are described generally as being performed by the system 200. The operations of the example processes may be performed by one of the components of the system 200 (e.g., the control unit 210, the monitoring application server 260, etc.) or may be performed by any combination of the components of the system 200. In some implementations, operations of the example processes may be performed by one or more processors included in one or more electronic devices.

FIG. 3 illustrates an example process 300 for coordinating tracking operation of cameras. The system 200 detects an event based on sensor data (310). For example, the system 200 detects an alarm event at the property based on sensor data captured by one or more sensors in the property. In this example the system 200 may detect sensor data indicating entry into the property in a state in which a monitoring (e.g., security) system of the property is in an armed state. In the armed state, the system 200 may detect an alarm event based on a door or window contact sensor detecting door or window opening, a motion sensor sensing motion in the property, a glass break sensor detecting glass break, and/or any other sensor data indicating a breach of the property by an intruder. The system 200 also may detect other alarm events, such as a fire alarm, a carbon monoxide alarm, etc.

In some implementations, the system 200 detects non-alarm events as the event that triggers camera tracking. In these implementations, the system 200 may continuously monitor sensor data and detect events that are abnormal. The system 200 also may have one or more rules that define events that trigger camera tracking. For instance, the system 200 may have a rule that camera tracking initiates any time a motion event is detected by a motion sensor located in a hallway of the property.

The system 200 controls cameras to enter a tracking mode based on the detected event (320). For instance, the system 200 sends commands to each camera in the property to enter a tracking mode based on detecting the event (e.g., an alarm event). In the tracking mode, each camera scans for a moving object by panning and tilting over an area of the property imaged by the camera.

In some implementations, the tracking mode begins and all cameras begin panning and/or tilting throughout a full range of motion in search of moving objects. In these implementations, the cameras capture images while panning and/or tilting and analyze the images for moving objects in the captured images. In response to a camera detecting a moving object based on the analysis, the camera locks onto the moving object and tracks the moving object while other cameras continue to pan and/or tilt until detection of a moving object in their field of view. If the moving object being tracked leaves the field of view of the camera, the camera resumes the search for moving objects by panning and/or tilting throughout its full range of motion. In the tracking mode, the cameras may only transmit images to a monitoring system control unit or server after detecting a moving object. Also, the cameras may only transmit images when the images of the moving object meet a certain level of quality. The level of quality may relate to the general quality of the image captured, as well as how well the image captures a representation of the moving object being tracked.

Tracking mode operation differs from normal operation of the cameras. For example, in normal operation, the cameras may be in a standby mode waiting for a command or detection of an event (e.g., a PIR motion sensor event) to begin capturing images. Normal operation also may involve the cameras periodically capturing images over the area of the property. Normal operation may involve less power than tracking operation.

In some examples, the system 200 may control the cameras to end tracking mode and return to normal operation based on sensor data indicating that an alarm event that initiated tracking mode operation is a false alarm or has been canceled. In these examples, the system 200 may receive a disarm command that cancels the alarm event at the property and the system 200 may control the cameras to return to normal operation based on the disarm command.

The system 200 detects one or more moving objects in images captured by the cameras (330). For instance, the system 200 analyzes images captured by the cameras for moving objects. In this regard, the system 200 may compare a series of captured images and identify an object that is changing position in the series of images as a moving object. The detection of one or more moving objects may be performed by the cameras themselves, a monitoring system control unit, or a server. Detection of the one or more moving objects may initiate tracking of the one or more moving objects.

The system 200 determines metadata related to capture of the one or more moving objects (340). For example, the system 200 determines metadata related to the one or more moving objects and/or the quality of the images capturing the one or more moving objects. In this example, the metadata may describe attributes of the moving object and/or how well the moving object can be viewed in the images.

In some implementations, the system 200 may determine a rating for quality of images of a moving object captured by a camera. The quality rating may be computed based on the general quality of the image captured (e.g., number of pixels, lighting level, etc.) and the view of the moving object in the image (e.g., whether any portion of the moving object is obstructed, whether the moving object is facing toward or away from the camera, how far the moving object is from the camera, etc.).

In some examples, the system 200 may determine descriptive information of the moving object captured by the camera. The descriptive information may indicate a type of the moving object detected (e.g., adult, child, animal, etc.), size attributes of the moving object (e.g., large, small, five feet tall, six feet tall, etc.), identifying information for the moving object (e.g., facial feature markers, etc.), and/or any other descriptive information that may be used to identify or compare the moving object to moving objects detected by other cameras.

In addition, the system 200 may determine a direction of movement of the moving object. The system 200 may control the camera to pan and tilt in the determined direction of movement of the moving object to enable tracking of the moving object in images captured by the camera. Further, the system 200 may use the direction of movement of the moving object to coordinate tracking operation of the cameras in the property. For example, the system 200 may determine that a moving object is moving away from a first camera that is presently tracking the moving object and toward a second camera that is not presently tracking the moving object. In this example, the system 200 may determine that the second camera is better suited than the first camera to track the moving object and control the second camera to pan toward the moving object and takeover tracking of the moving object from the first camera, which allows the first camera to scan for other moving objects.

In some implementations, the system 200 determines whether a detected moving object is the same as a subsequent moving objected detected in subsequent images captured by a camera. In these implementations, the detection that a moving object is the same as a prior object allows the moving object to be tracked by the camera keeping the same object in its field of view. The system 200 may track the moving object based on the determination of whether the moving object is the same as a subsequent moving objected detected in subsequent images captured by the camera.

The system 200 coordinates tracking operation of the cameras based on the metadata (350). For example, the system 200 intelligently controls the cameras to capture detected moving objects in a manner that provides the most information about the moving objects and the property as a whole. In this example, the system 200 may detect that two cameras are tracking the same object based on the metadata. In this case, the system 200 uses the metadata to select which camera is best suited to capture the object and controls the other camera to resume scanning for other objects. In this regard, the system 200 uses camera resources efficiently and reduces the amount of redundant information collectively captured by the cameras. Although better information of the moving object may be obtained by allowing both cameras to track the moving object, the system 200 determines that one camera is sufficient and uses the other camera to scan for other objects that may otherwise go undetected. Accordingly, the other camera may increase the total amount of information available by detecting another moving object or confirming that other moving objects are not present in the area of the property imaged by the other camera.

In some implementations, the system 200 coordinates tracking operation of the cameras based on metadata related to quality of images of a moving object captured by a camera. In these implementations, the system 200 may use the quality metadata to select which camera should continue tracking a moving object when the system 200 determines that multiple cameras are tracking the same object.

In addition, the system 200 may use quality thresholds to coordinate tracking operation. For instance, the system 200 may compare quality ratings of captured images to one or more quality thresholds and determine whether the quality ratings meet the one or more quality thresholds. If the system 200 determines that a quality threshold is met, the system 200 may control the camera to continue to continue tracking the moving object. However, if the system 200 determines that a quality threshold is not met, the system 200 may cease tracking of the moving object by the camera.

The system 200 also may use the quality ratings and quality thresholds to determine whether to transmit images. For example, the system 200 may only have cameras transmit images to a monitoring system control unit (or to a remote server) based on the quality rating for the image meeting a quality threshold. Also, the system 200 may consider the quality of prior images in determining whether to transmit a current image. For instance, the system 200 may determine to transmit the current image only if has a quality that exceeds the quality of a prior image already transmitted.

In some implementations, the system 200 coordinates tracking operation of the cameras based on metadata related to descriptive information of a moving object captured by a camera. In these examples, the system 200 may use the descriptive information to determine attributes of the moving object. For example, the descriptive information may indicate a type of the moving object and the system 200 may use the type of the moving object to coordinate tracking. In this example, the type of the object may indicate whether the object is an adult, a child, or a pet and the system 200 may discontinue tracking of the object if it is a pet. Also, if a camera images two moving objects, the system 200 may use the type of the two objects to select which object to track (e.g., track an adult as a potential intruder as opposed to a pet, or track a known child instead of a known adult given greater concerns over the safety need to track the child). The system 200 may use any suitable rules to coordinate tracking of objects based on the types of the objects detected.

Also, the metadata may indicate a pan and tilt orientation of the cameras and/or an area of the property covered in the images currently being captured. The system 200 may use this information to determine whether multiple cameras are pointed in the same direction and covering the same area of the property.

In addition, the system 200 may use the descriptive information to determine when multiple cameras are tracking the same object. When the system 200 determines that multiple cameras are tracking the same object, the system 200 may use various techniques to determine which camera should continue tracking the object. For example, the system 200 may assess which camera is closest to the object and select the closest camera. In this example, the system 200 may determine that a first moving object tracked by a first camera is the same as a second moving object tracked by a second camera based on first descriptive information and second descriptive information. Based on the determination that the first moving object is the same as the second moving object, the system 200 may determine that the first camera is closer to the object than the second camera. Based on the determination that the first camera is closer to the object than the second camera, the system 200 controls the first camera to continue tracking the object and the second camera to scan for other objects.

In some implementations, the system 200 uses metadata related to quality of images of a moving object captured by a camera to determine which camera should continue tracking the object. For instance, the system 200 may determine that a first rating for quality of a first camera is higher than a second rating for quality of a second camera, and, based on the determination that the first rating for quality is higher than the second rating for quality, control the first camera to continue tracking the object and the second camera to scan for other objects.

Figure 4A:
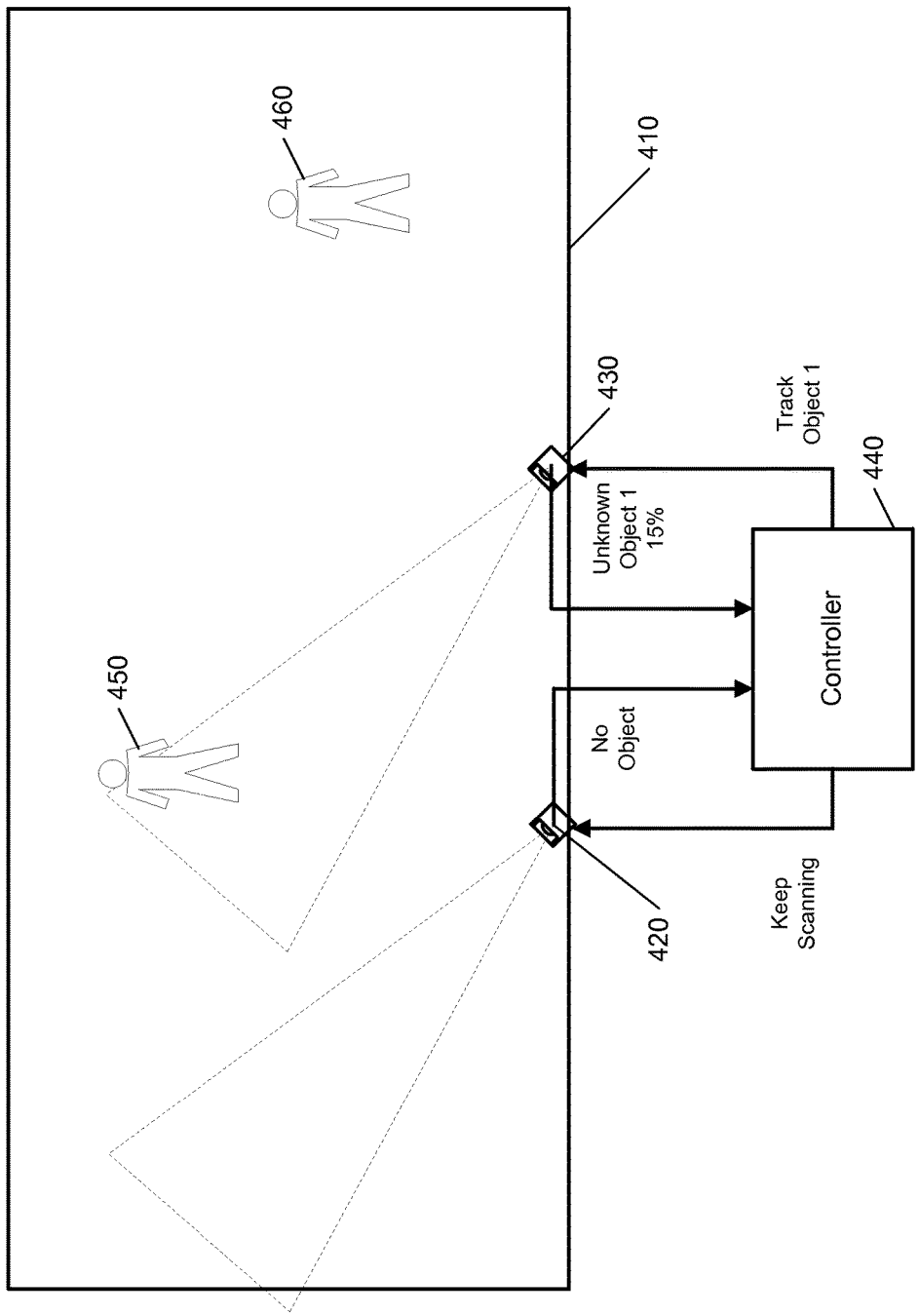
FIGS. 4A-4E illustrate examples of coordinating tracking operation of cameras.

FIGS. 4A-4E illustrate examples of coordinating tracking operation of cameras. As shown in FIG. 4A, a property 410 is monitored by a monitoring system that includes a first camera 420, a second camera 430, and a controller 440. In the example shown in FIG. 4A, the controller 440 has detected an event at the property 410 based on sensor data and has controlled the first camera 420 and the second camera 430 to enter tracking mode in which the first camera 420 and the second camera 430 pan and tilt throughout a full range of motion searching for moving objects in the property 410. In FIG. 4A, the first camera 420 has not detected any moving objects in the tracking mode and sends metadata to the controller 440 indicating that no object has been detected. The second camera 430 has detected a moving object (e.g., a user 450) in the tracking mode and sends metadata to the controller 440 indicating that an unknown type of moving object has been detected, that the object has been assigned an identifier of "Object 1" for tracking purposes, and that the quality of the capture of the moving object is at 15%. The second camera 430 determines the quality rating of 15% on a scale of 0% to 100% with 0% representative of no image information of an object and 100% representative of the best image information of an object (e.g., object is facing the camera, a few feet from camera, in clear focus, well lit, etc.). The first camera 420 and the second camera 430 determine quality ratings based on various factors including distance of object from camera, the object's orientation relative to the camera, lighting levels in the captured image, focus of the object in the captured image, the size of the object in the captured image, obstructions of the object in the captured image, and any other criteria that relate to the quality of how well the image captures image information for the object.

Based on the metadata received from the first camera 420 and the second camera 430, the controller 440 sends control commands to the first camera 420 and the second camera 430. Specifically, the controller 440 sends a control command to the first camera 420 to control the first camera 420 to continue scanning for moving objects based on the metadata indicating that no object has been detected. The controller 440 also sends a control command to the second camera 430 to control the second camera 430 to track the detected object identified as "Object 1."

Figure 4B:
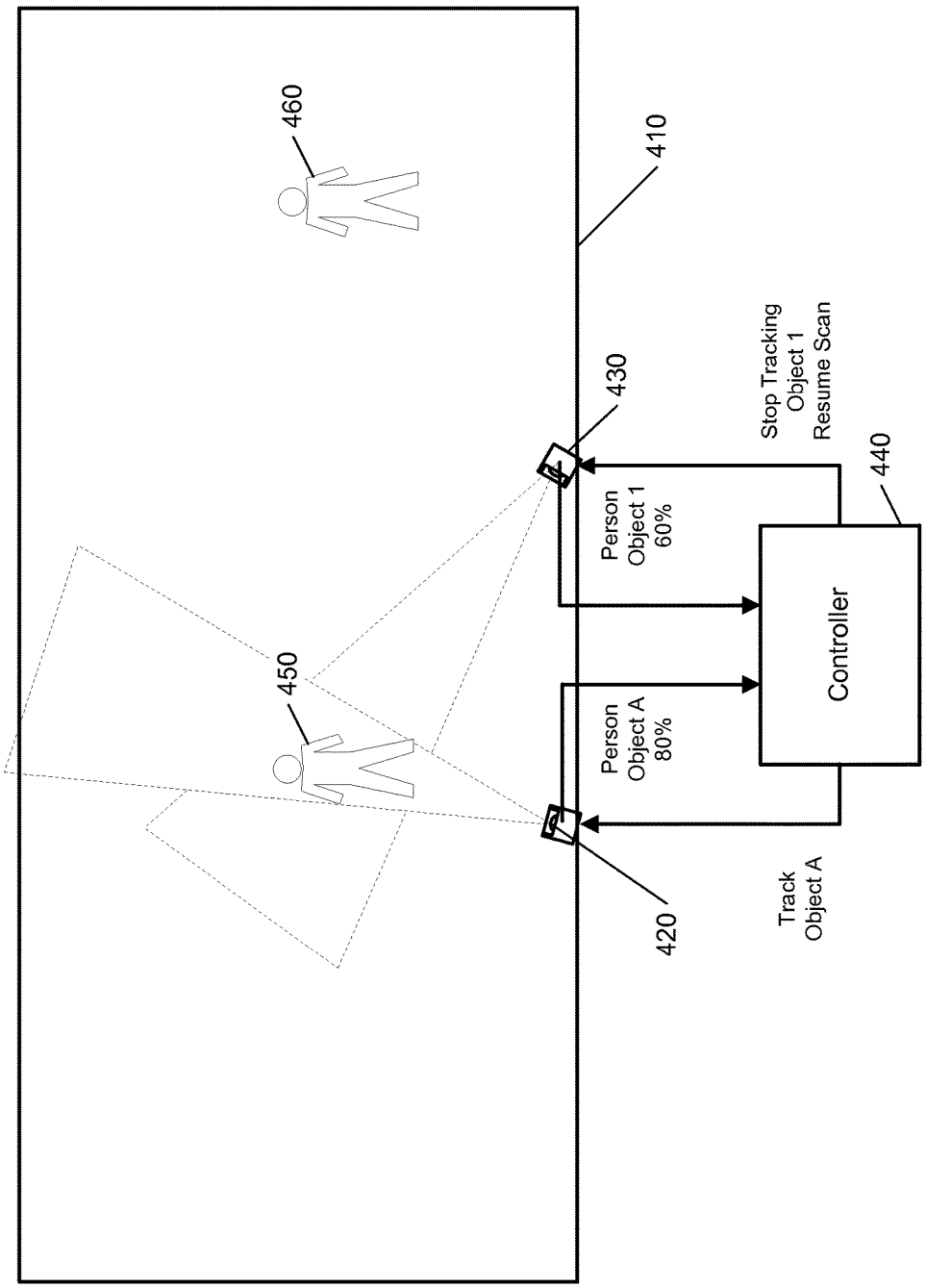

FIG. 4B illustrates the example shown in FIG. 4A at a later point in time after the second camera 430 started tracking the object identified as "Object 1." As shown in FIG. 4B, the user 450 has moved to a position closer to the first camera 420 than the second camera 430. Based on the control command to track the detected object identified as "Object 1," the second camera 430 has panned in a direction corresponding to movement of the user 450 and maintains the user 450 in its field of view. As shown, the second camera 430 sends metadata to the controller 440 indicating that the object is a person, that the object remains the object identified by the identifier of "Object 1," and that the quality of the capture of the moving object is at 60%. In this regard, the quality of the capture of the user 450 by the second camera 430 has improved and the second camera 430 has been able to determine that the object identified by the identifier of "Object 1" is a person.

Also, in FIG. 4B, the first camera 420 has now detected the user 450 in scanning for moving objects in the tracking mode. The first camera 420 sends metadata to the controller 440 indicating that a person has been detected, that the object has been assigned an identifier of "Object A" for tracking purposes, and that the quality of the capture of the moving object is at 80%.

The controller 440 compares metadata and/or image data from the first camera 420 and the second camera 430 and, based on the comparison, determines that the object detected by the first camera 420 identified as "Object A" is the same as the object detected by the second camera 430 identified as "Object 1." For instance, the controller 440 considers the orientations of the first camera 420 and the second camera 430, determines that the field of view of the first camera 420 overlaps the field of view of the second camera 430, and determines that descriptive information about "Object A" is sufficiently similar to descriptive information about "Object 1" to conclude that the two objects are the same given the overlapping fields of view of the first camera 420 and the second camera 430.

Based on the determination that the first camera 420 and the second camera 430 have detected the same object, the controller 440 performs a process to select which camera to track the object. Although the second camera 430 was first tracking the object and has improved in the quality of images capturing the object as compared to the start of tracking, the controller 440 selects the first camera 420 to track the object. For example, the controller 440 compares the quality ratings from the first camera 420 and the second camera 430 and determines that the first camera 420 has a higher quality rating than the second camera 430. In this example, the controller 440 determines that the object (i.e., the user 450) is closer to the first camera 420 than the second camera 430 and that the object (i.e., the user 450) has been moving in a direction that is more toward the first camera 420 than the second camera 430. Accordingly, the controller 440 selects the first camera 420 to track the object (i.e., the user 450) and sends appropriate control commands to the first camera 420 and the second camera 430. As shown, the controller 440 sends a control command to the first camera 420 to control the first camera 420 to track the detected object identified as "Object A." The controller 440 also sends a control command to the second camera 430 to control the second camera 430 to stop tracking the detected object identified as "Object 1" and to resume scanning for other objects.

Figure 4C:
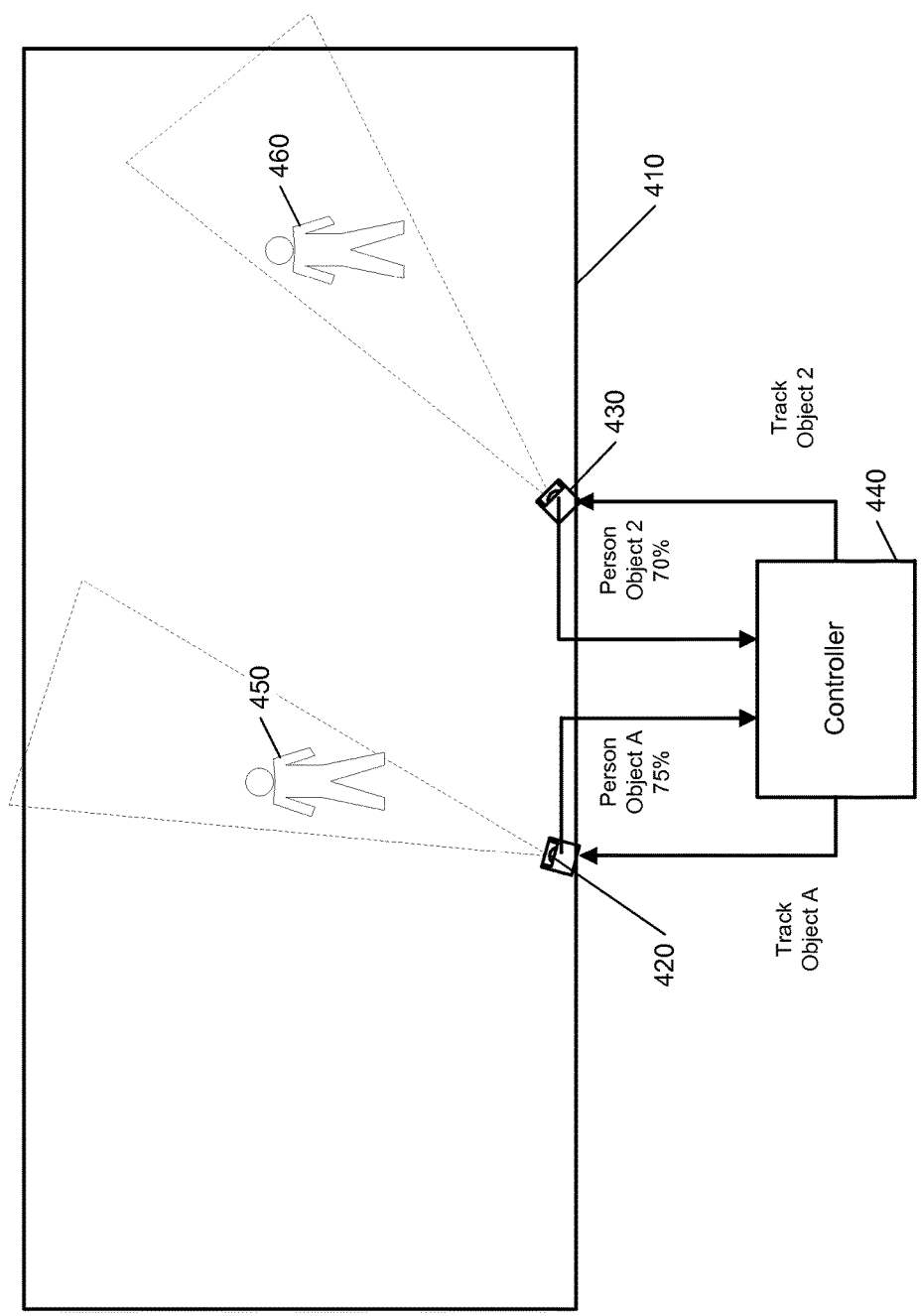

FIG. 4C illustrates the example shown in FIG. 4B at a later point in time after the first camera 420 started tracking the object identified as "Object A" and the second camera 430 has resumed scanning. As shown in FIG. 4C, based on the control command to track the detected object identified as "Object A," the first camera 420 has panned in a direction corresponding to movement of the user 450 and maintains the user 450 in its field of view. As shown, the first camera 420 sends metadata to the controller 440 indicating that the object is a person, that the object remains the object identified by the identifier of "Object A," and that the quality of the capture of the moving object is at 75%.

In addition, as part of the resumed scanning, the second camera 430 has detected a moving object (e.g., a user 460) in the tracking mode and sends metadata to the controller 440 indicating that a person has been detected, that the object has been assigned an identifier of "Object 2" for tracking purposes, and that the quality of the capture of the moving object is at 70%. In this regard, the second camera 430 was able to determine that, due to different descriptive attributes and the scanning motion performed by the second camera 430, the current object detected (i.e., user 460) is different than the prior object detected (i.e., user 450). In this regard, the controller 440 is able to determine that the first camera 420 and the second camera 430 are not detecting the same object. Thus, the controller 440 sends a control command to the first camera 420 to control the first camera 420 to continue tracking the detected object identified as "Object A." The controller 440 also sends a control command to the second camera 430 to control the second camera 430 to track the detected object identified as "Object 2."

Figure 4D:
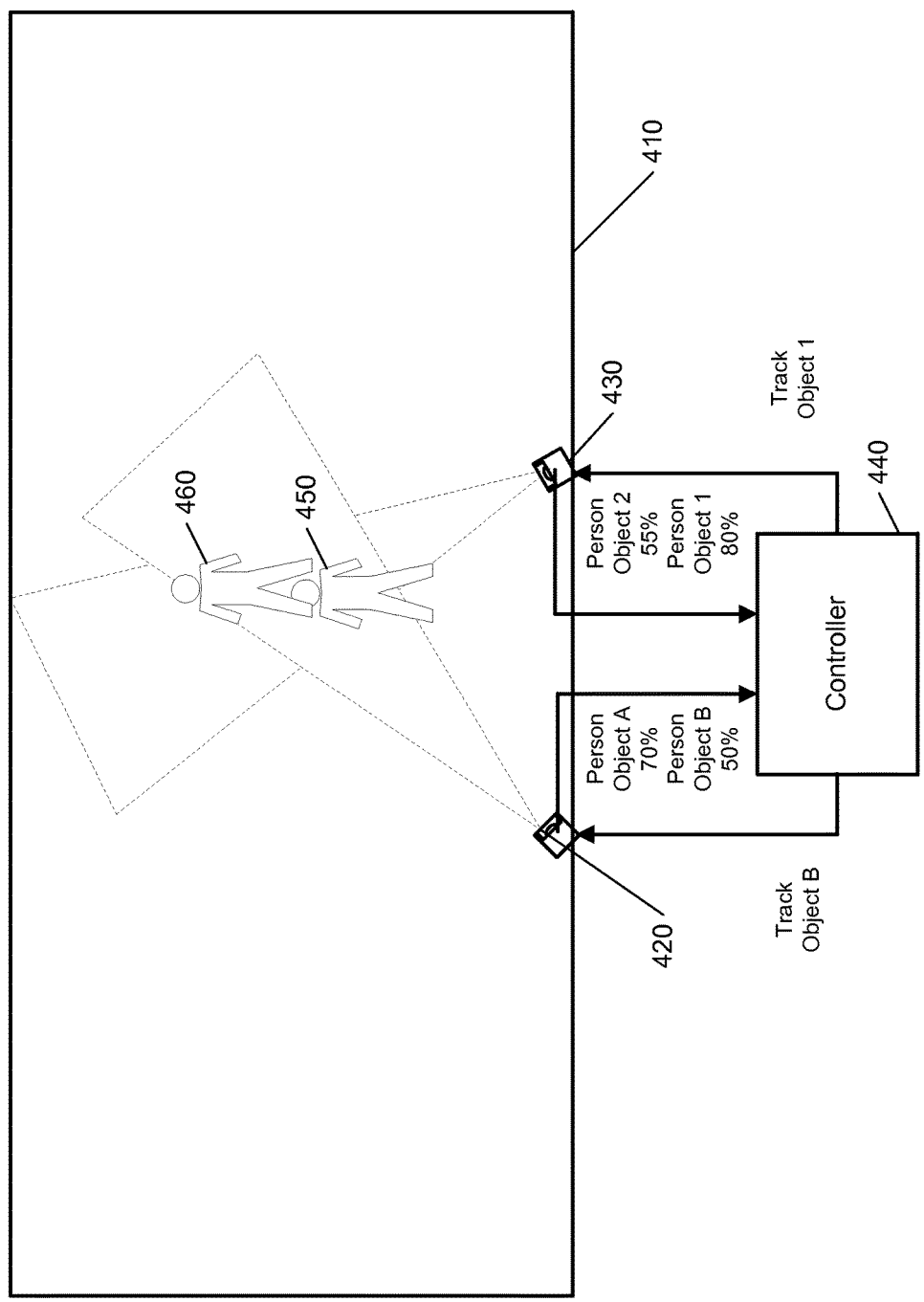

FIG. 4D illustrates the example shown in FIG. 4C at a later point in time after the first camera 420 has continued tracking the object identified as "Object A" and the second camera 430 has started tracking the detected object identified as "Object 2." As shown in FIG. 4D, the user 450 and the user 460 have moved close together. Based on the control command to track the detected object identified as "Object A," the first camera 420 has panned in a direction corresponding to movement of the user 450 and maintains the user 450 in its field of view. Also, based on the control command to track the detected object identified as "Object 2," the second camera 430 has panned in a direction corresponding to movement of the user 460 and maintains the user 460 in its field of view. Because the user 450 and the user 460 have moved close together, the user 450 and the user 460 are both detected by the first camera 420 and the second camera 430. As a consequence, the first camera 420 and the second camera 430 both send the controller 440 metadata related to two different objects.

As shown, the first camera 420 sends metadata to the controller 440 indicating that a first object is a person, that the first object is the object identified by the identifier of "Object A," and that the quality of the capture of the first object is at 70%. The first camera 420 also sends metadata to the controller 440 indicating that a second object is a person, that the second object is assigned the identifier of "Object B," and that the quality of the capture of the second object is at 50%.

In addition, the second camera 430 sends metadata to the controller 440 indicating that a first object is a person, that the first object is the object identified by the identifier of "Object 2," and that the quality of the capture of the first object is at 55%. The second camera 430 also sends metadata to the controller 440 indicating that a second object is a person, that the second object is the object identified by the identifier of "Object 1," and that the quality of the capture of the second object is at 80%.

The controller 440 processes the metadata from the first camera 420 and the second camera 430. As an initial part of the processing, the controller 440 compares descriptive information in the metadata and orientation information for the first camera 420 and the second camera 430 to determine the number of distinct objects in the images detected by the first camera 420 and the second camera 430. In this regard, the controller 440 determines that two distinct objects have been detected, that "Object A" is the same as "Object 1," and that "Object B" is the same as "Object 2."

Based on these determinations, the controller 440 performs a process to select which camera to track which object. In this regard, the controller 440 considers the quality of the images of each object captured by the first camera 420 and the second camera 430. The controller 440 determines that the second camera 430 captures higher quality images of the user 450 and the user 460. Based on that determination, the controller 440 considers the relative difference in quality and direction of user movement. In this regard, the controller 440 determines that the difference between the quality of capture of user 450 by the second camera 430 is higher than the difference between the quality of capture of user 460 by the second camera 430. The controller 440 also determines that the user 450 is moving toward the second camera 430 and the user 460 is moving toward the first camera 420. Based on these determinations, the controller 440 selects the first camera 420 to track the user 460 and selects the second camera 430 to track the user 450. In this regard, the controller 440 sends a control command to the first camera 420 to control the first camera 420 to track the detected object identified as "Object B." The controller 440 also sends a control command to the second camera 430 to control the second camera 430 to track the detected object identified as "Object 1."

Figure 4E:
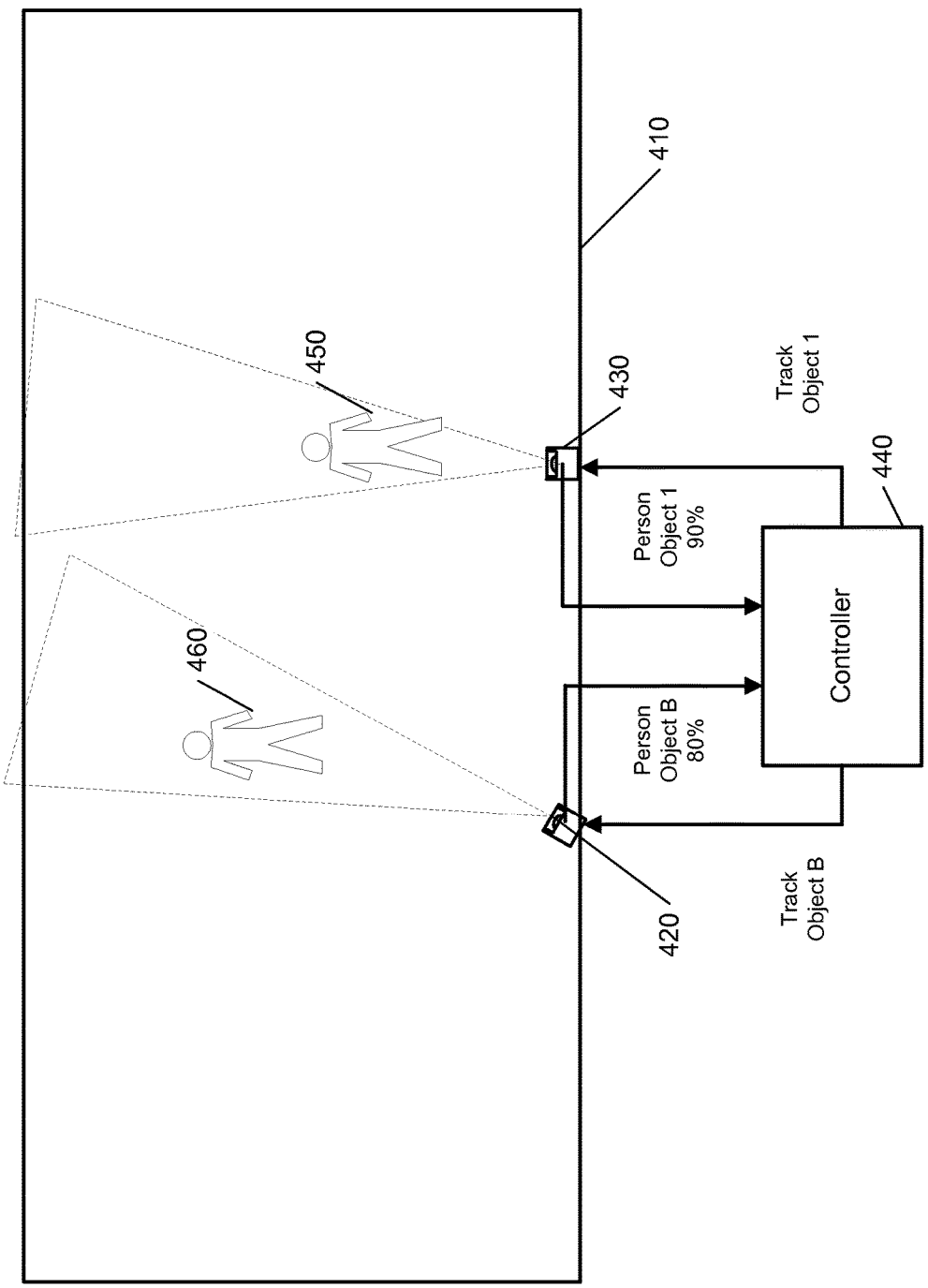

FIG. 4E illustrates the example shown in FIG. 4D at a later point in time after the first camera 420 has started tracking the object identified as "Object B" and the second camera 430 has started tracking the object identified as "Object 1." As shown in FIG. 4E, based on the control command to track the detected object identified as "Object B," the first camera 420 has panned in a direction corresponding to movement of the user 460 and maintains the user 460 in its field of view. Also, based on the control command to track the detected object identified as "Object 1," the second camera 430 has panned in a direction corresponding to movement of the user 450 and maintains the user 450 in its field of view. In this regard, the controller 440 intelligently controls the first camera 420 and the second camera 430 to track the users 450 and 460 in the property, exchanging tracking responsibilities as needed to maintain the best images of the users 450 and 460 as possible.

FIG. 5 illustrates an example process 500 for coordinating tracking operation of cameras based on available power. The system 200 determines power available to cameras (510). For example, the system 200 determines whether each camera is operating on battery power or a primary power source, such an alternating current (AC) power. To the extent one or more cameras are operating on battery power, the system 200 may determine the level of battery power remaining.

The system 200 coordinates tracking operation of the cameras based on the determined power available (520). For instance, in addition to the techniques described above related to coordinating camera tracking based on metadata related to captured images, the system 200 also may use available power as another variable in coordinating camera tracking. In this regard, the system 200 may weigh tracking operation to cameras with higher available power.

For example, the system 200 may determine that a first moving object detected by a first camera and a second moving object detected by a second camera are the same based on metadata. In this example, the system 200 may determine that the first camera is capturing superior images than the second camera based on the metadata, but also determine that the first camera is operating on battery power and the second camera is operating on a primary power source provided at the property (e.g., AC power). If the superiority of the first camera does not exceed a threshold level, the system 200 may override the determination that the first camera is capturing superior images than the second camera based on the determination that the first camera is operating on battery power and the second camera is operating on the primary power source provided at the property. Accordingly, the system 200 may control the first camera to stop tracking and the second camera to continue tracking based on overriding the determination that the first camera is capturing superior images than the second camera.

In addition, the system 200 may consider battery levels in coordinating camera tracking operation. For instance, the system 200 may weigh tracking operation to cameras with higher battery levels. The system 200 also may modify the types of operations each camera performs based on the level of battery power remaining at the camera. In this regard, the system 200 may instruct cameras with low battery levels to enter a standby mode, rather than scan for or track moving objects, thereby reserving remaining power to capture images when the content of those images is expected to be highly relevant.

Figure 6A:
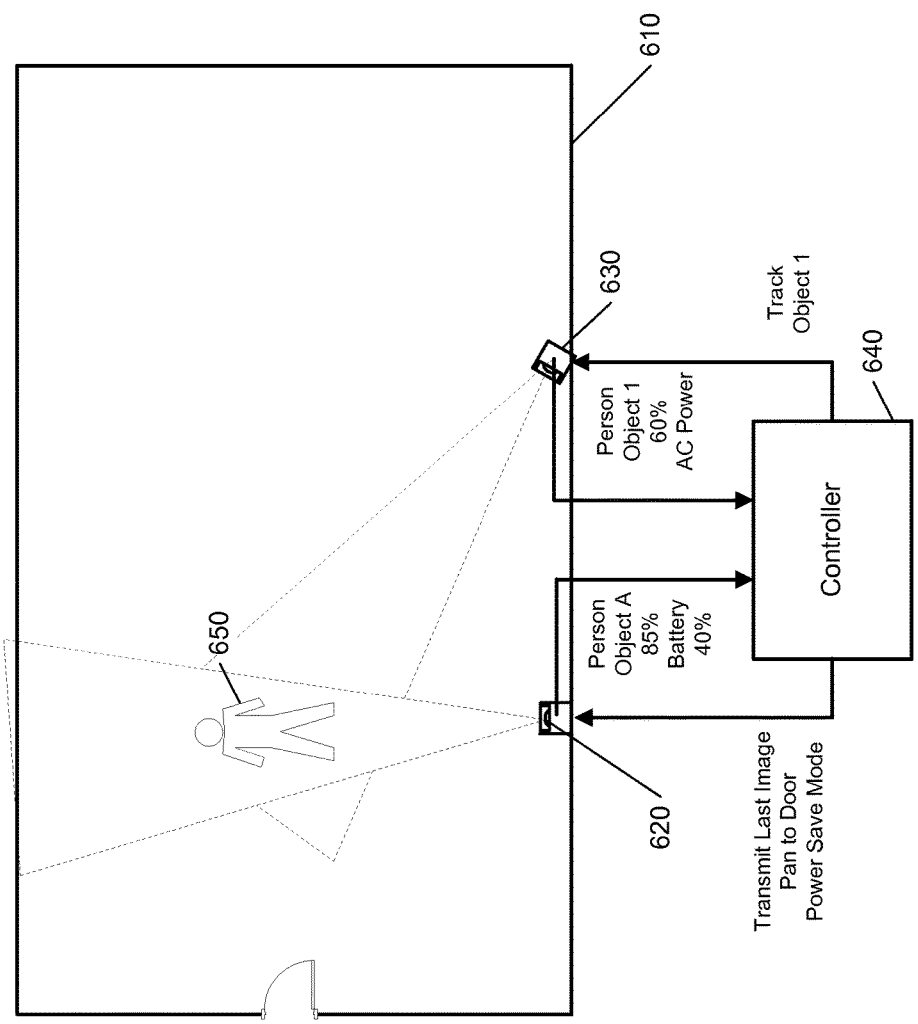
FIGS. 6A and 6B illustrate examples of coordinating tracking operation of cameras based on available power.
Figure 6B:
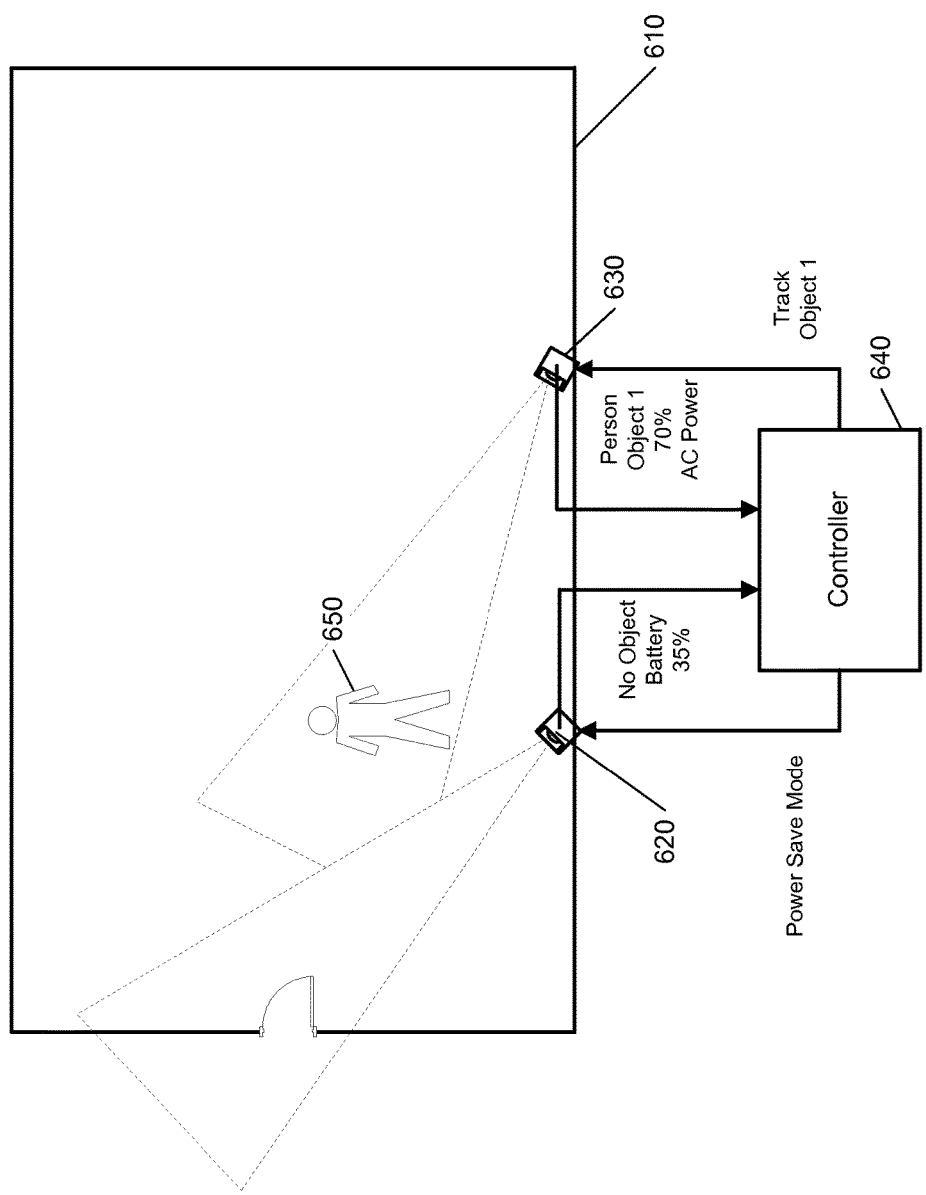

FIGS. 6A and 6B illustrate examples of coordinating tracking operation of cameras based on available power. As shown in FIG. 6A, a property 610 is monitored by a monitoring system that includes a first camera 620, a second camera 630, and a controller 640. In the example shown in FIG. 6A, the controller 640 has detected an event at the property 610 based on sensor data and has controlled the first camera 620 and the second camera 630 to enter tracking mode in which the first camera 620 and the second camera 630 pan and tilt throughout a full range of motion searching for moving objects in the property 610. In FIG. 6A, the first camera 420 has detected a moving object (e.g., a user 650) in the tracking mode and sends metadata to the controller 640 indicating that a person has been detected, that the object has been assigned an identifier of "Object A" for tracking purposes, that the quality of the capture of the moving object is at 85%, and the battery level for the first camera 620 is at 40%. The second camera 630 also has detected a moving object (e.g., the user 650) in the tracking mode and sends metadata to the controller 640 indicating that a person has been detected, that the object has been assigned an identifier of "Object 1" for tracking purposes, that the quality of the capture of the moving object is at 60%, and that the second camera 630 is operating on AC power.

The controller 640 compares metadata and/or image data from the first camera 620 and the second camera 630 and, based on the comparison, determines that the object detected by the first camera 620 identified as "Object A" is the same as the object detected by the second camera 630 identified as "Object 1." For instance, the controller 640 considers the orientations of the first camera 620 and the second camera 630, determines that the field of view of the first camera 620 overlaps the field of view of the second camera 630, and determines that descriptive information about "Object A" is sufficiently similar to descriptive information about "Object 1" to conclude that the two objects are the same given the overlapping fields of view of the first camera 620 and the second camera 630.

Based on the determination that the first camera 620 and the second camera 630 have detected the same object, the controller 640 performs a process to select which camera to track the object. For example, the controller 640 compares the quality ratings from the first camera 620 and the second camera 630 and determines that the first camera 620 has a higher quality rating than the second camera 630. The controller 640 also determines that the first camera 620 has a relatively low battery power level relative to the AC power of the second camera 630.

Based on the determination that the first camera 620 has a relatively low battery power level relative to the AC power of the second camera 630, the controller 640 initiates a process to consider whether the quality determination should be overridden due to power consideration. In this regard, the controller 640 assesses the quality of images of the object that have already been captured and the relative difference in quality between the first camera 620 and the second camera 630. In this example, the controller 640 has defined that high quality images are those having a quality at or above a threshold of 80%. The controller 640 also has defined that a quality difference of less than 30% warrants allowing power considerations to override quality considerations. In this case, the controller 640 determines that the first camera 620 has already captured an image that has a quality (85%) above the high quality threshold (80%) and that the difference in quality between the first camera 620 and the second camera 630 (25%) is less than the permissible quality difference (30%). Accordingly, the controller 640 determines to override the quality considerations and allow the power considerations to select the second camera 630 to track the object.

The controller 640 then sends appropriate control commands to the first camera 620 and the second camera 630. As shown, the controller 640 sends a control command to the first camera 620 to control the first camera 620 to transmit the last image captured of the object (e.g., the high quality image), to pan to a door of the property 610 were important images may be needed, and to enter a power save mode in which the first camera 620 does not scan for other objects and merely awaits another command to capture further images. The controller 640 also sends a control command to the second camera 630 to control the second camera 630 to track the detected object identified as "Object 1."

FIG. 6B illustrates the example shown in FIG. 6A at a later point in time after the second camera 630 started tracking the object identified as "Object 1." As shown in FIG. 6B, based on the control command to track the detected object identified as "Object 1," the second camera 630 has panned in a direction corresponding to movement of the user 650 and maintains the user 650 in its field of view. As shown, the second camera 630 sends metadata to the controller 640 indicating that the object is a person, that the object remains the object identified by the identifier of "Object 1," that the quality of the capture of the moving object is at 70%, and the second camera 630 has AC power available.

Also, in FIG. 4B, the first camera 620 has moved to a position that images the door of the property 610. As shown, the first camera 620 sends metadata to the controller 640 indicating that no object is detected and the first camera 620 has a battery level of 35%.

Given these circumstances and the fact that the quality has improved for the second camera 630, the controller 640 determines to have the first camera 620 remain in the power save mode and the second camera 630 to continue tracking the user 450. Accordingly, the controller 640 sends a control command to the first camera 620 to control the first camera 620 to remain in the power save mode in which the first camera 620 does not scan for other objects and merely awaits another command to capture further images. The controller 640 also sends a control command to the second camera 630 to control the second camera 630 to continue tracking the detected object identified as "Object 1."

FIG. 7 illustrates an example process 700 for controlling tracking operation of cameras based on basic and richer metadata. The system 200 determines basic metadata related to capture of one or more moving objects (710). For instance, the system 200 determines the basic metadata as information that can be determined from analysis of images alone. In this regard, the basic metadata may include the quality data and descriptive information of detected objects described throughout this disclosure. The system 200 may initially determine basic metadata based on image analysis of one or more images of a moving object without reference to prior images captured by the first camera.

The system 200 initially controls tracking operation of cameras based on the basic metadata (720). For example, the system 200 may control tracking operation of cameras based on the quality data and descriptive information of detected objects. The control may be similar to the techniques described above related to coordinating tracking operation of cameras based on metadata.

The system 200 determines richer metadata related to capture of the one or more moving objects (730). For example, the system 200 subsequently determines richer metadata based on analysis of the one or more images of the first moving object in comparison with prior images captured by the first camera. In this example, the system 200 may perform more sophisticated and processing intensive operations on the metadata and/or images and may compare the metadata and/or images to image information previously captured by the cameras or otherwise associated with the property. In this regard, the system 200 may determine things such as: the number of people in the property immediately after the event, the number of times one or all of those in the property have previously been in the property, the likelihood that one or all of those in the property are residents or employees in the property, etc.

The user may define rules to further assist in metadata creation that is rendered at the server level. For example, the user/owner may provide a rule that states that any person that is at the property more than ten times in a twenty day period after the hour of 9:30 pm and before the hour of 8 am is a resident, while anyone who accesses the property more than ten times in a twenty day period, but never between 9:30 pm and 8 am is an employee. The user may further upload images of trusted parties, such as family members.

The system 200 may further establish rich metadata by using other information, such as a geographic location data of a recent entrant if geographic location services were activated by that user (e.g., using the one or more user device 240, 250), the passcode (e.g., the PIN) that the occupant keyed into the panel to attempt to disarm the panel, and the pattern of peripheral sensor events immediately prior and after the alarm event. In this regard, the system 200 may continue to monitor sensor data sensed after detection of the event and include the sensor data as part of richer metadata related to the event and camera tracking incident to the event. The tracked sensor data may include data indicating which motion sensors have detected motion, which door or window contact sensors have detected an opening or closing, etc.

The system 200 subsequently controls tracking operation of cameras based on the richer metadata (740). For example, the system 200 accounts for the richer metadata in adjusting tracking operations that were coordinated using basic metadata and that may no longer be relevant in view of the richer metadata. In this example, the richer metadata may reveal that a person being tracked is an owner of the property and, thus, should not be tracked. Also, the system 200 may determine that sensor data throughout the property indicates activity in another area such that a camera should stop tracking a person for whom the system 200 already has a high quality image and scan for other persons in the area of the property where the activity was detected by the sensors.

Figure 8A:
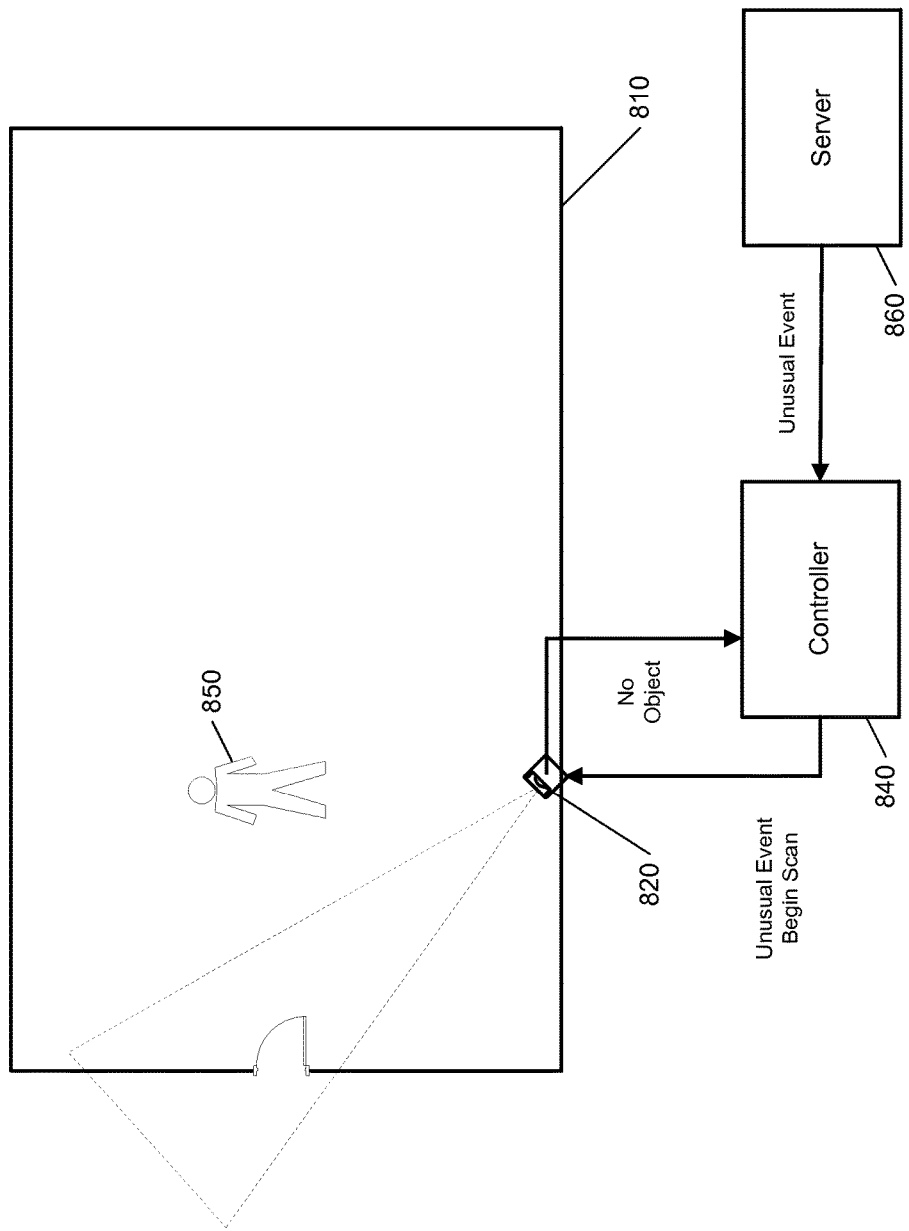
FIGS. 8A-8D illustrate examples of coordinating tracking operation of cameras based on basic and richer metadata.

FIGS. 8A-8D illustrate examples of coordinating tracking operation of cameras based on basic and richer metadata. As shown in FIG. 8A, a property 810 is monitored by a monitoring system that includes a camera 820, a controller 840, and a server 860. In the example shown in FIG. 8A, the server 860 has detected an unusual event at the property 810 based on sensor data. The unusual event is not an alarm event, but rather an atypical event that warrants consideration of whether an intrusion is taking place, despite the absence of an alarm. In this case, the server 860 informs the controller 840 of the unusual event and the controller, in turn, controls the camera 820 to enter tracking mode in which the camera 820 pans and tilts throughout a full range of motion searching for moving objects in the property 810. As shown in FIG. 8A, the camera 820 starts from a normal operating orientation in which the camera 820 has a door of the property in its field of view and waits for commands to capture images.

Figure 8B:
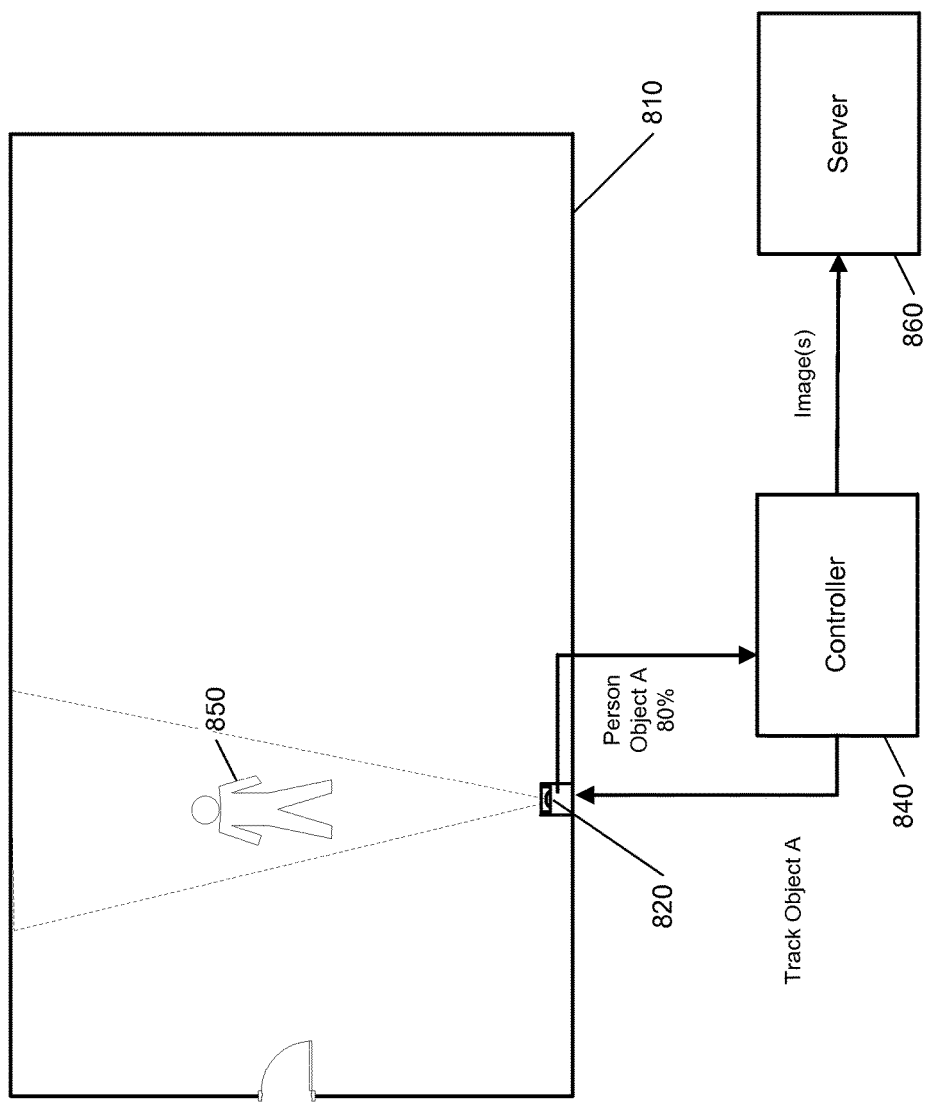

FIG. 8B illustrates the example shown in FIG. 8A at a later point in time after the camera 820 has started scanning for objects. In FIG. 8B, the camera 820 has panned from its normal operating orientation and has detected a moving object (e.g., a user 850) in the tracking mode and sends basic metadata to the controller 840 indicating that a person has been detected, that the object has been assigned an identifier of "Object A" for tracking purposes, and that the quality of the capture of the moving object is at 80%. Based on the basic metadata, the controller 840 determines that the camera 820 should track "Object A" and sends a control command to the camera 820 to control the camera 820 to track the detected object identified as "Object A." The controller 840 also sends one or more images captured by the camera 820 to the server 860 for further analysis and development of richer metadata.

Figure 8C:
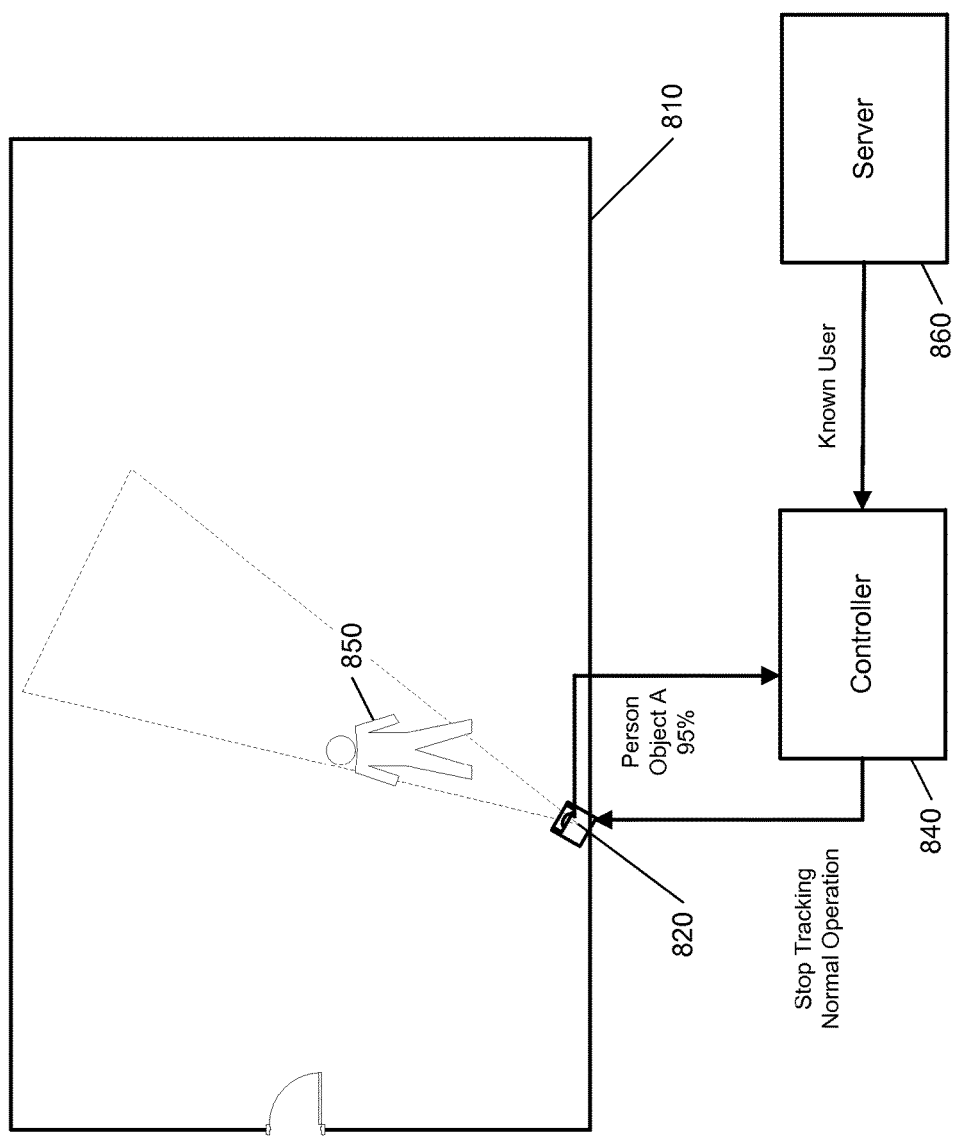

FIG. 8C illustrates the example shown in FIG. 8B at a later point in time after the camera 820 started tracking the object identified as "Object A." As shown in FIG. 8C, based on the control command to track the detected object identified as "Object A," the camera 820 has panned in a direction corresponding to movement of the user 850 and maintains the user 850 in its field of view. As shown, the camera 820 sends metadata to the controller 840 indicating that the object is a person, that the object remains the object identified by the identifier of "Object A," and that the quality of the capture of the moving object is at 95%. The controller 840 determines that this basic metadata suggests that the camera 820 should continue tracking the object identified by the identifier of "Object A."

The controller 840 also receives richer metadata from the server 860. Specifically, the server 860 has analyzed the one or more images received from the controller 840 against images known to be associated with the property 810 and has determined that the object detected is a known person that does not present a threat to the property 810 and, thus, does not need to be tracked. For instance, the server 860 may use facial recognition techniques to compare the one or more images received from the controller 840 against images of residents of the property 810. The images of the residents of the property 810 may have been uploaded to the server 860 by one of the residents or may have been taken by the camera 820 and inferred to be residents based on prior usage of and presence in the property 810. As shown in FIG. 8C, the server 860 communicates richer metadata to the controller 840 to indicate that the detected object is a known resident of the property 810.

Based on the richer metadata, the controller 840 overrides the determination made using the basic metadata that the camera 820 should continue tracking the object identified by the identifier of "Object A." The controller 840 determines not to continue tracking the object identified by the identifier of "Object A" based on the richer metadata and sends a control command to the camera 820 to control the camera 820 to stop tracking the detected object identified as "Object A" and resume normal operation.

Figure 8D:
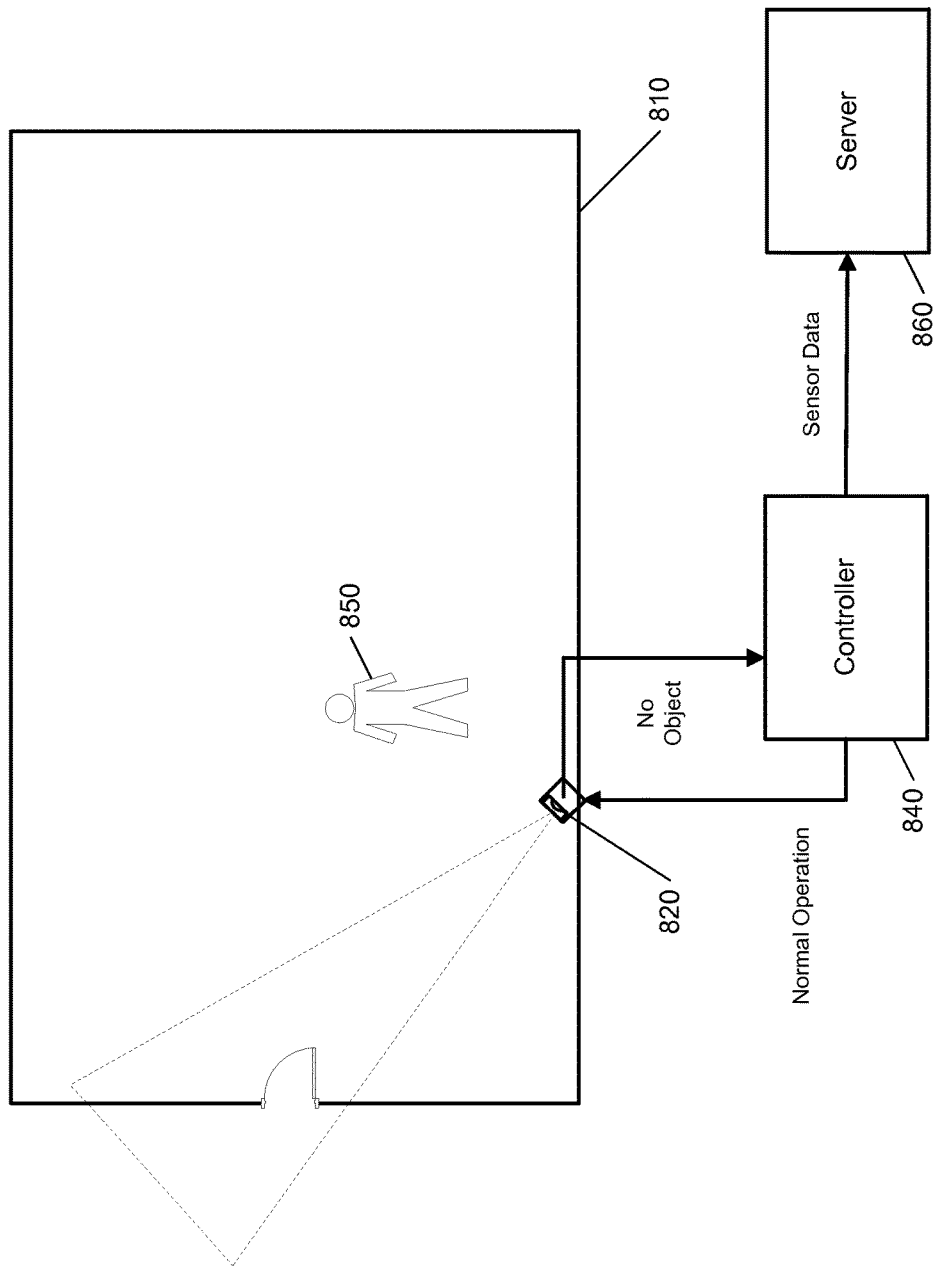

FIG. 8D illustrates the example shown in FIG. 8C at a later point in time after the camera 820 has stopped tracking the object identified as "Object A." As shown in FIG. 8D, the camera 820 has returned to its normal operating orientation in which the door of the property 810 is in its field of view. The camera 820 awaits control commands and periodically captures images of the door. As shown, the camera 820 send metadata to the controller 840 indicating that no object has been detected. The controller 840 continues to send sensor data to the server 860 for further tracking and analysis and also sends a command to the camera 820 to remain in normal operating mode because no alarm or unusual events have been detected.

As indicated in the above description, the operations of the example processes 300, 500, and 700 may be performed by one or more controllers. For example, the one or more controllers may be located in a monitoring system control unit for a monitoring system located at the property, may be located in cameras in the monitoring system, may be located in mobile devices that are associated with the monitoring system, and/or may be located in a remote server that communicates with the monitoring system. Any suitable combination of one or more controllers may be used to perform the operation in the processes. For instance, a single controller in a monitoring system control unit may perform all of the operations in the processes. Also, controllers in each of the cameras may coordinate to perform all of the operations in the processes. Further, controllers in a monitoring system control unit, one or more cameras, and a remote server may work together to perform operations in the processes. In this regard, a controller in each camera may detect objects, track objects, and determine basic metadata, a controller in a remote server may determine richer metadata, and a controller in a monitoring system control unit may receive sensor data, basic metadata, and richer metadata, detect events, and coordinate tracking operation of the cameras.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system for monitoring a property, the system comprising:
  one or more sensors that are installed at a property and that are configured to sense attributes of the property;
  a first camera that is installed at the property, that is configured to pan and tilt, and that is configured to image a first area of the property;
  a second camera that is installed at the property, that is configured to pan and tilt, and that is configured to image a second area of the property, the second area of the property being different than the first area; and
  at least one controller configured to perform operations comprising:
    detecting an event at the property based on sensor data from the one or more sensors that are installed at the property and that are configured to sense attributes of the property;
    based on the detected event:
      controlling the first camera to enter a tracking mode in which the first camera scans for a moving object by panning and tilting over the first area of the property imaged by the first camera, and
      controlling the second camera to enter the tracking mode in which the second camera scans for a moving object by panning and tilting over the second area of the property imaged by the second camera;
    detecting a first moving object imaged by the first camera in the tracking mode;
    based on detection of the first moving object imaged by the first camera in the tracking mode:
      tracking the first moving object by panning and tilting in a manner that follows movements of the first moving object throughout the first area of the property imaged by the first camera, and determining first metadata related to capture of images of the first moving object tracked by the first camera;

detecting a second moving object imaged by the second camera in the tracking mode;

based on detection of the second moving object imaged by the second camera in the tracking mode:
  tracking the second moving object by panning and tilting in a manner that follows movements of the second moving object throughout the second area of the property imaged by the second camera, and
  determining second metadata related to capture of images of the second moving object tracked by the second camera; and
  coordinating tracking operation of the first camera and the second camera based on the first metadata and the second metadata, wherein the at least one controller is configured to perform operations further comprising determining first power available to the first camera and determining second power available to the second camera, wherein coordinating tracking operation of the first camera and the second camera based on the first metadata and the second metadata comprises coordinating tracking operation of the first camera and the second camera based on the first metadata, the second metadata, the first power available to the first camera, and the second power available to the second camera, wherein determining first power available to the first camera comprises determining that the first camera is operating on battery power, wherein determining second power available to the second camera comprises determining that the second camera is operating on a primary power source provided at the property, and wherein coordinating tracking operation of the first camera and the second camera based on the first metadata, the second metadata, the first power available to the first camera, and the second power available to the second camera comprises determining that the first moving object and the second moving object are the same based on the first metadata and the second metadata, determining to track the first moving object using the first camera based on a first rating for quality of images of the first moving object captured by the first camera and a second rating for quality of images of the second moving object captured by the second camera, overriding the determination to track the first moving object using the first camera based on the determination that the first camera is operating on battery power and the second camera is operating on the primary power source provided at the property, and controlling the first camera to stop tracking and the second camera to continue tracking based on overriding the determination to track the first moving object using the first camera.

2. The system of claim 1:

wherein determining first metadata related to capture of images of the first moving object tracked by the first camera comprises determining a first rating for quality of images of the first moving object captured by the first camera;

wherein determining second metadata related to capture of images of the second moving object tracked by the second camera comprises determining a second rating for quality of images of the second moving object captured by the second camera; and wherein coordinating tracking operation of the first camera and the second camera based on the first metadata and the second metadata comprises coordinating tracking operation of the first camera and the second camera based on the first rating for quality of images of the first moving object captured by the first camera and the second rating for quality of images of the second moving object captured by the second camera.

3. The system of claim 2, wherein coordinating tracking operation of the first camera and the second camera based on the first rating for quality of images of the first moving object captured by the first camera and the second rating for quality of images of the second moving object captured by the second camera comprises ceasing tracking of the first moving object by the first camera based on the first rating for quality being below a quality threshold.

4. The system of claim 1:

wherein determining first metadata related to capture of images of the first moving object tracked by the first camera comprises determining first descriptive information of the first moving object captured by the first camera;

wherein determining second metadata related to capture of images of the second moving object tracked by the second camera comprises determining second descriptive information of the second moving object captured by the second camera; and wherein coordinating tracking operation of the first camera and the second camera based on the first metadata and the second metadata comprises coordinating tracking operation of the first camera and the second camera based on the first descriptive information and the second descriptive information.

5. The system of claim 4, wherein coordinating tracking operation of the first camera and the second camera based on the first descriptive information and the second descriptive information comprises determining that the first moving object is the same as the second moving object based on the first descriptive information and the second descriptive information, based on the determination that the first moving object is the same as the second moving object, determining that the first camera is closer to the first moving object than the second camera is to the second moving object, and, based on the determination that the first camera is closer to the first moving object than the second camera is to the second moving object, controlling the first camera to continue tracking the first moving object and the second camera to scan for other objects.

6. The system of claim 4:

wherein determining first metadata related to capture of images of the first moving object tracked by the first camera comprises determining a first rating for quality of images of the first moving object captured by the first camera;

wherein determining second metadata related to capture of images of the second moving object tracked by the second camera comprises determining a second rating for quality of images of the second moving object captured by the second camera; and wherein coordinating tracking operation of the first camera and the second camera based on the first descriptive information and the second descriptive information comprises coordinating tracking operation of the first camera and the second camera based on the first descriptive information, the second descriptive information, the first rating for quality of images of the first moving object captured by the first camera, and the second rating for quality of images of the second moving object captured by the second camera.

7. The system of claim 6, coordinating tracking operation of the first camera and the second camera based on the first descriptive information, the second descriptive information, the first rating for quality of images of the first moving object captured by the first camera, and the second rating for quality of images of the second moving object captured by the second camera comprises determining that the first moving object is the same as the second moving object based on the first descriptive information and the second descriptive information, based on the determination that the first moving object is the same as the second moving object, determining that the first rating for quality is higher than the second rating for quality, and, based on the determination that the first rating for quality is higher than the second rating for quality, controlling the first camera to continue tracking the first moving object and the second camera to scan for other objects.

8. The system of claim 1, wherein the at least one controller is configured to perform operations comprising determining a direction of movement of the first moving object and controlling the first camera to pan and tilt in the determined direction of movement of the first moving object.

9. The system of claim 1:
wherein the at least one controller is configured to perform operations comprising determining first power available to the first camera and determining second power available to the second camera, and
wherein coordinating tracking operation of the first camera and the second camera based on the first metadata and the second metadata comprises coordinating tracking operation of the first camera and the second camera based on the first metadata, the second metadata, the first power available to the first camera, and the second power available to the second camera.

10. The system of claim 1:
wherein determining first metadata related to capture of images of the first moving object tracked by the first camera comprises:
initially determining basic metadata based on image analysis of one or more images of the first moving object without reference to prior images captured by the first camera, and
subsequently determining rich metadata based on analysis of the one or more images of the first moving object in comparison with prior images captured by the first camera, and
wherein coordinating tracking operation of the first camera and the second camera based on the first metadata and the second metadata comprises:
initially coordinating tracking operation of the first camera and the second camera based on the basic metadata, and
modifying tracking operation of the first camera and the second camera based on the rich metadata.

11. The system of claim 1, wherein the at least one controller comprises a single controller located in a control unit that receives the sensor data from the one or more sensors and communicates with the first camera and the second camera to send control commands to the first camera and the second camera and receive images from the first camera and the second camera.

12. The system of claim 1, wherein the at least one controller comprises a first controller of the first camera, a second controller of the second camera, and a third controller of a control unit that receives the sensor data from the one or more sensors.

13. The system of claim 12:
wherein the third controller detects the event at the property, controls the first camera to enter the tracking mode, controls the second camera to enter the tracking mode, and coordinates tracking operation of the first camera and the second camera,
wherein the first controller detects the first moving object imaged by the first camera in the tracking mode, tracks the first moving object, and determines the first metadata related to capture of images of the first moving object,
wherein the second controller detects the second moving object imaged by the second camera in the tracking mode, tracks the second moving object, and determines the second metadata related to capture of images of the second moving object, and
wherein the third controller coordinates tracking operation of the first camera and the second camera by receiving, from the first controller, the first metadata related to capture of images of the first moving object, receiving, from the second controller, the second metadata related to capture of images of the second moving object, analyzing the first metadata relative to the second metadata, and controlling at least one of the first camera or the second camera based on the analysis of the first metadata relative to the second metadata.

14. The system of claim 1, wherein the at least one controller comprises a first controller of the first camera and a second controller of the second camera.

15. The system of claim 14:
wherein the first controller and the second controller each detects the event at the property,
wherein the first controller controls the first camera to enter the tracking mode, detects the first moving object imaged by the first camera in the tracking mode, tracks the first moving object, and determines the first metadata related to capture of images of the first moving object,
wherein the second controller controls the second camera to enter the tracking mode, detects the second moving object imaged by the second camera in the tracking mode, tracks the second moving object, and determines the second metadata related to capture of images of the second moving object, and
wherein the first controller and the second controller coordinate tracking operation of the first camera and the second camera by exchanging metadata with one another.

16. The system of claim 1, wherein the at least one controller is configured to perform operations comprising determining first power available to the first camera and determining second power available to the second camera.

17. A method comprising:
detecting an event at a property based on sensor data from one or more sensors that are installed at the property and that are configured to sense attributes of the property;
based on the detected event:
controlling a first camera to enter a tracking mode in which the first camera scans for a moving object by panning and tilting over a first area of the property imaged by the first camera, and
controlling a second camera to enter the tracking mode in which the second camera scans for a moving object by panning and tilting over a second area of the property imaged by the second camera;
detecting a first moving object imaged by the first camera in the tracking mode;
based on detection of the first moving object imaged by the first camera in the tracking mode:
  tracking the first moving object by panning and tilting in a manner that follows movements of the first moving object throughout the first area of the property imaged by the first camera, and
  determining first metadata related to capture of images of the first moving object tracked by the first camera;
detecting a second moving object imaged by the second camera in the tracking mode;
based on detection of the second moving object imaged by the second camera in the tracking mode:
  tracking the second moving object by panning and tilting in a manner that follows movements of the second moving object throughout the second area of the property imaged by the second camera, and
  determining second metadata related to capture of images of the second moving object tracked by the second camera;
coordinating tracking operation of the first camera and the second camera based on the first metadata and the second metadata; and
determining first power available to the first camera and determining second power available to the second camera,
wherein coordinating tracking operation of the first camera and the second camera based on the first metadata and the second metadata comprises coordinating tracking operation of the first camera and the second camera based on the first metadata, the second metadata, the first power available to the first camera, and the second power available to the second camera,
wherein determining first power available to the first camera comprises determining that the first camera is operating on battery power,
wherein determining second power available to the second camera comprises determining that the second camera is operating on a primary power source provided at the property, and
wherein coordinating tracking operation of the first camera and the second camera based on the first metadata, the second metadata, the first power available to the first camera, and the second power available to the second camera comprises determining that the first moving object and the second moving object are the same based on the first metadata and the second metadata, determining to track the first moving object using the first camera based on a first rating for quality of images of the first moving object captured by the first camera and a second rating for quality of images of the second moving object captured by the second camera, overriding the determination to track the first moving object using the first camera based on the determination that the first camera is operating on battery power and the second camera is operating on the primary power source provided at the property, and controlling the first camera to stop tracking and the second camera to continue tracking based on overriding the determination to track the first moving object using the first camera.

18. A system for monitoring a property, the system comprising:

one or more sensors that are installed at a property and that are configured to sense attributes of the property;
a first camera that is installed at the property, that is configured to pan and tilt, and that is configured to image a first area of the property;
a second camera that is installed at the property, that is configured to pan and tilt, and that is configured to image a second area of the property, the second area of the property being different than the first area; and
at least one controller configured to perform operations comprising:
  detecting an event at the property based on sensor data from the one or more sensors that are installed at the property and that are configured to sense attributes of the property;
  based on the detected event:
    controlling the first camera to enter a tracking mode in which the first camera scans for a moving object by panning and tilting over the first area of the property imaged by the first camera, and
    controlling the second camera to enter the tracking mode in which the second camera scans for a moving object by panning and tilting over the second area of the property imaged by the second camera;
  detecting a first moving object imaged by the first camera in the tracking mode;
  based on detection of the first moving object imaged by the first camera in the tracking mode:
    tracking the first moving object by panning and tilting in a manner that follows movements of the first moving object throughout the first area of the property imaged by the first camera, and
    determining first metadata related to capture of images of the first moving object tracked by the first camera;
  detecting a second moving object imaged by the second camera in the tracking mode;
  based on detection of the second moving object imaged by the second camera in the tracking mode:
    tracking the second moving object by panning and tilting in a manner that follows movements of the second moving object throughout the second area of the property imaged by the second camera, and
    determining second metadata related to capture of images of the second moving object tracked by the second camera; and
  coordinating tracking operation of the first camera and the second camera based on the first metadata and the second metadata,
wherein the at least one controller is configured to perform operations further comprising determining first power available to the first camera and determining second power available to the second camera,
wherein coordinating tracking operation of the first camera and the second camera based on the first metadata and the second metadata comprises coordinating tracking operation of the first camera and the second camera based on the first metadata, the second metadata, the first power available to the first camera, and the second power available to the second camera,
wherein the first camera has a first rechargeable battery that is rechargeable based on pan and tilt movement of the first camera,
wherein the second camera has a second rechargeable battery that is rechargeable based on pan and tilt movement of the second camera, wherein determining first power available to the first camera comprises determining a first level of the first rechargeable battery, wherein determining second power available to the second camera comprises determining a second level of the second rechargeable battery, and wherein coordinating tracking operation of the first camera and the second camera based on the first metadata, the second metadata, the first power available to the first camera, and the second power available to the second camera comprises coordinating tracking operation of the first camera and the second camera based on the first metadata, the second metadata, the first level of the first rechargeable battery, and the second level of the second rechargeable battery.

19. At least one non-transitory computer-readable storage medium having stored thereon instructions which, when executed by at least one processor, cause performance of operations comprising:

detecting an event at a property based on sensor data from one or more sensors that are installed at the property and that are configured to sense attributes of the property;

based on the detected event:
    controlling a first camera to enter a tracking mode in which the first camera scans for a moving object by panning and tilting over a first area of the property imaged by the first camera, and
    controlling a second camera to enter the tracking mode in which the second camera scans for a moving object by panning and tilting over a second area of the property imaged by the second camera;

detecting a first moving object imaged by the first camera in the tracking mode;

based on detection of the first moving object imaged by the first camera in the tracking mode:
    tracking the first moving object by panning and tilting in a manner that follows movements of the first moving object throughout the first area of the property imaged by the first camera, and
    determining first metadata related to capture of images of the first moving object tracked by the first camera;

detecting a second moving object imaged by the second camera in the tracking mode;

based on detection of the second moving object imaged by the second camera in the tracking mode:
    tracking the second moving object by panning and tilting in a manner that follows movements of the second moving object throughout the second area of the property imaged by the second camera, and
    determining second metadata related to capture of images of the second moving object tracked by the second camera;

coordinating tracking operation of the first camera and the second camera based on the first metadata and the second metadata; and determining first power available to the first camera and determining second power available to the second camera, wherein coordinating tracking operation of the first camera and the second camera based on the first metadata and the second metadata comprises coordinating tracking operation of the first camera and the second camera based on the first metadata, the second metadata, the first power available to the first camera, and the second power available to the second camera, wherein determining first power available to the first camera comprises determining that the first camera is operating on battery power, wherein determining second power available to the second camera comprises determining that the second camera is operating on a primary power source provided at the property, and wherein coordinating tracking operation of the first camera and the second camera based on the first metadata, the second metadata, the first power available to the first camera, and the second power available to the second camera comprises determining that the first moving object and the second moving object are the same based on the first metadata and the second metadata, determining to track the first moving object using the first camera based on a first rating for quality of images of the first moving object captured by the first camera and a second rating for quality of images of the second moving object captured by the second camera, overriding the determination to track the first moving object using the first camera based on the determination that the first camera is operating on battery power and the second camera is operating on the primary power source provided at the property, and controlling the first camera to stop tracking and the second camera to continue tracking based on overriding the determination to track the first moving object using the first camera.

* * * * *